United States Patent
Parfentieva et al.

(10) Patent No.: US 9,047,275 B2
(45) Date of Patent: Jun. 2, 2015

(54) METHODS AND SYSTEMS FOR ALIGNMENT OF PARALLEL TEXT CORPORA

(75) Inventors: Tatiana Parfentieva, Moscow (RU); Anton Krivenko, Moscow (RU); Konstantin Zuev, Moscow (RU); Konstantin Anisimovich, Moscow (RU); Vladimir Selegey, Moscow (RU)

(73) Assignee: ABBYY InfoPoisk LLC (RU)

( * ) Notice: Subject to any disclaimer, the term of this patent is extended or adjusted under 35 U.S.C. 154(b) by 273 days.

(21) Appl. No.: 13/464,447

(22) Filed: May 4, 2012

(65) Prior Publication Data

US 2012/0239378 A1    Sep. 20, 2012

Related U.S. Application Data

(63) Continuation-in-part of application No. 11/690,102, filed on Mar. 22, 2007, now Pat. No. 8,195,447, which is a continuation-in-part of application No. 11/548,214, filed on Oct. 10, 2006, now Pat. No. 8,078,450, application No. 13/464,447, which is a continuation-in-part of application No. 11/690,104, filed on Mar. 22, 2007, now Pat. No. 8,214,199, which is a continuation-in-part of application No. 11/548,214, filed on Oct. 10, 2006, now Pat. No. 8,078,450.

(51) Int. Cl.
    *G06F 17/28* (2006.01)
    *G06F 17/27* (2006.01)

(52) U.S. Cl.
    CPC ........ *G06F 17/2881* (2013.01); *G06F 17/2785* (2013.01)

(58) Field of Classification Search
    CPC ....................................................... G06F 17/28
    USPC .................................. 704/4, 2, 3, 5, 7, 9, 245
    See application file for complete search history.

(56) References Cited

U.S. PATENT DOCUMENTS

| | | | |
|---|---|---|---|
| 4,706,212 A | 11/1987 | Toma | |
| 5,068,789 A | 11/1991 | Van Vliembergen | |
| 5,128,865 A | 7/1992 | Sadler | |
| 5,146,405 A | 9/1992 | Church | |
| 5,175,684 A | 12/1992 | Chong | |
| 5,418,717 A | 5/1995 | Su et al. | |

(Continued)

OTHER PUBLICATIONS

Moore, Robert C. "Fast and accurate sentence alignment of bilingual corpora." Machine Translation: From Research to Real Users. Springer Berlin Heidelberg, 2002. 135-144.*

(Continued)

*Primary Examiner* — Vincent P Harper
(74) *Attorney, Agent, or Firm* — LeighAnn Weiland; Veronica Weinstein

(57) ABSTRACT

Computer-implemented systems and methods align fragments of a first text with corresponding fragments of a second text, which is a translation of the first text. One preferred embodiment preliminarily divides the first and second texts into fragments; generates a hypothesis about the correspondence between the fragments of the first and second texts; performs a lexico-morphological analysis of the fragments using linguistic descriptions; performs a syntactic analysis of the fragments using linguistic descriptions and generates syntactic structures for the fragments; generates semantic structures for the fragments; and estimates the degree of correspondence between the semantic structures.

28 Claims, 23 Drawing Sheets

(56) References Cited

U.S. PATENT DOCUMENTS

| | | | |
|---|---|---|---|
| 5,426,583 | A | 6/1995 | Uribe-Echebarria |
| 5,475,587 | A | 12/1995 | Anick et al. |
| 5,477,451 | A | 12/1995 | Brown et al. |
| 5,490,061 | A | 2/1996 | Tolin et al. |
| 5,497,319 | A | 3/1996 | Chong et al. |
| 5,510,981 | A | 4/1996 | Berger et al. |
| 5,550,934 | A | 8/1996 | Van Vliembergen |
| 5,559,693 | A | 9/1996 | Anick et al. |
| 5,677,835 | A | 10/1997 | Carbonell et al. |
| 5,696,980 | A | 12/1997 | Brew |
| 5,715,468 | A | 2/1998 | Budzinski |
| 5,721,938 | A | 2/1998 | Stuckey |
| 5,724,593 | A | 3/1998 | Hargrave, III et al. |
| 5,737,617 | A | 4/1998 | Bernth et al. |
| 5,768,603 | A | 6/1998 | Brown et al. |
| 5,784,489 | A | 7/1998 | Van Vliembergen et al. |
| 5,794,050 | A | 8/1998 | Dahlgren et al. |
| 5,794,177 | A | 8/1998 | Carus et al. |
| 5,826,219 | A | 10/1998 | Kutsumi |
| 5,826,220 | A | 10/1998 | Takeda et al. |
| 5,848,385 | A | 12/1998 | Poznanski et al. |
| 5,873,056 | A | 2/1999 | Liddy et al. |
| 5,884,247 | A | 3/1999 | Christy |
| 6,223,150 | B1 | 4/2001 | Duan et al. |
| 6,233,544 | B1 | 5/2001 | Alshawi |
| 6,243,669 | B1 | 6/2001 | Horiguchi et al. |
| 6,243,670 | B1 | 6/2001 | Bessho et al. |
| 6,260,008 | B1 | 7/2001 | Sanfilippo |
| 6,266,642 | B1 | 7/2001 | Franz et al. |
| 6,275,789 | B1 | 8/2001 | Moser et al. |
| 6,278,967 | B1 | 8/2001 | Akers et al. |
| 6,282,507 | B1 | 8/2001 | Horiguchi et al. |
| 6,285,978 | B1 | 9/2001 | Bernth et al. |
| 6,330,530 | B1 | 12/2001 | Horiguchi et al. |
| 6,356,864 | B1 | 3/2002 | Foltz et al. |
| 6,356,865 | B1 | 3/2002 | Franz et al. |
| 6,463,404 | B1 | 10/2002 | Appleby |
| 6,470,306 | B1 | 10/2002 | Pringle et al. |
| 6,622,123 | B1 | 9/2003 | Chanod et al. |
| 6,658,627 | B1 | 12/2003 | Gallup et al. |
| 6,721,697 | B1 | 4/2004 | Duan et al. |
| 6,760,695 | B1 | 7/2004 | Kuno et al. |
| 6,778,949 | B2 | 8/2004 | Duan et al. |
| 6,871,174 | B1 | 3/2005 | Dolan et al. |
| 6,871,199 | B1 | 3/2005 | Binnig et al. |
| 6,901,399 | B1 | 5/2005 | Corston et al. |
| 6,901,402 | B1 | 5/2005 | Corston-Oliver et al. |
| 6,928,448 | B1 | 8/2005 | Franz et al. |
| 6,937,974 | B1 | 8/2005 | d'Agostini |
| 6,947,923 | B2 | 9/2005 | Cha et al. |
| 6,965,857 | B1 | 11/2005 | Decary |
| 6,983,240 | B2 | 1/2006 | Ait-Mokhtar et al. |
| 6,986,104 | B2 | 1/2006 | Green et al. |
| 7,013,264 | B2 | 3/2006 | Dolan et al. |
| 7,020,601 | B1 | 3/2006 | Hummel et al. |
| 7,027,974 | B1 | 4/2006 | Busch et al. |
| 7,050,964 | B2 | 5/2006 | Menzes et al. |
| 7,085,708 | B2 | 8/2006 | Manson |
| 7,167,824 | B2 | 1/2007 | Kallulli |
| 7,191,115 | B2 | 3/2007 | Moore |
| 7,475,015 | B2 | 1/2009 | Epstein et al. |
| 7,672,830 | B2 * | 3/2010 | Goutte et al. ............... 704/2 |
| 7,739,102 | B2 | 6/2010 | Bender |
| 2001/0014902 | A1 | 8/2001 | Hu et al. |
| 2001/0029455 | A1 | 10/2001 | Chin et al. |
| 2002/0040292 | A1 | 4/2002 | Marcu |
| 2003/0158723 | A1 | 8/2003 | Masuichi et al. |
| 2003/0176999 | A1 | 9/2003 | Calcagno et al. |
| 2003/0182102 | A1 | 9/2003 | Corston-Oliver et al. |
| 2003/0204392 | A1 | 10/2003 | Finnigan et al. |
| 2004/0098247 | A1 | 5/2004 | Moore |
| 2004/0122656 | A1 | 6/2004 | Abir |
| 2004/0172235 | A1 | 9/2004 | Pinkham et al. |
| 2004/0193401 | A1 | 9/2004 | Ringger et al. |
| 2004/0254781 | A1 | 12/2004 | Appleby |
| 2005/0010421 | A1 | 1/2005 | Watanabe et al. |
| 2005/0015240 | A1 | 1/2005 | Appleby |
| 2005/0080613 | A1 | 4/2005 | Colledge et al. |
| 2005/0086047 | A1 | 4/2005 | Uchimoto |
| 2005/0137853 | A1 | 6/2005 | Appleby |
| 2005/0155017 | A1 | 7/2005 | Berstis et al. |
| 2005/0171757 | A1 | 8/2005 | Appleby |
| 2005/0209844 | A1 | 9/2005 | Wu et al. |
| 2005/0267871 | A1 * | 12/2005 | Marchisio et al. ............. 707/3 |
| 2006/0004563 | A1 | 1/2006 | Campbell et al. |
| 2006/0004567 | A1 | 1/2006 | Russell |
| 2006/0080079 | A1 | 4/2006 | Yamabana |
| 2006/0095250 | A1 | 5/2006 | Chen et al. |
| 2006/0217964 | A1 | 9/2006 | Kamatani et al. |
| 2006/0224378 | A1 | 10/2006 | Chino et al. |
| 2006/0293876 | A1 | 12/2006 | Kamatani et al. |
| 2007/0010990 | A1 | 1/2007 | Woo |
| 2007/0016398 | A1 | 1/2007 | Buchholz |
| 2007/0083359 | A1 | 4/2007 | Bender |
| 2007/0100601 | A1 | 5/2007 | Kimura |

OTHER PUBLICATIONS

Ma, Xiaoyi. "Champollion: A robust parallel text sentence aligner." LREC 2006: Fifth International Conference on Language Resources and Evaluation. May 2006.*

Samuelsson, Yvonne, and Martin Volk. "Alignment tools for parallel treebanks."Proceedings of GLDV Frühjahrstagung 2007.*

Padó, Sebastian, and Mirella Lapata. "Cross-linguistic projection of role-semantic information." Proceedings of the conference on Human Language Technology and Empirical Methods in Natural Language Processing. Association for Computational Linguistics, 2005.*

Alvis, Acronym, and Reviewer Adeline Nazarenko. "Deliverable D6. 4 Month 36 Dec. 2006." (2006).*

Weigang et al. "Aligning Bilingual Corpora Using Sentences Location Information." 哈尔滨工业大学信息检索研究室论文集 2 (2004): 40.*

Mitamura, T., et al. "An Efficient Interlingua Translation System for Multi-lingual Document Production," Proceedings of Machine Translation Summitt III, Washington DC, Jul. 2-4, 1991.

Hutchins, Machine Translation: Past, Present, Future, Ellis Horwood, Chichester, UK, 1986.

Bolshakov, I.A. "Co-Ordinative Ellipsis in Russian Texts: Problems of Description and Restoration" Proceedings of the 12th conference on Computational linguistics—vol. 1, pp. 65-67. Association for Computational Linguistics 1988.

* cited by examiner

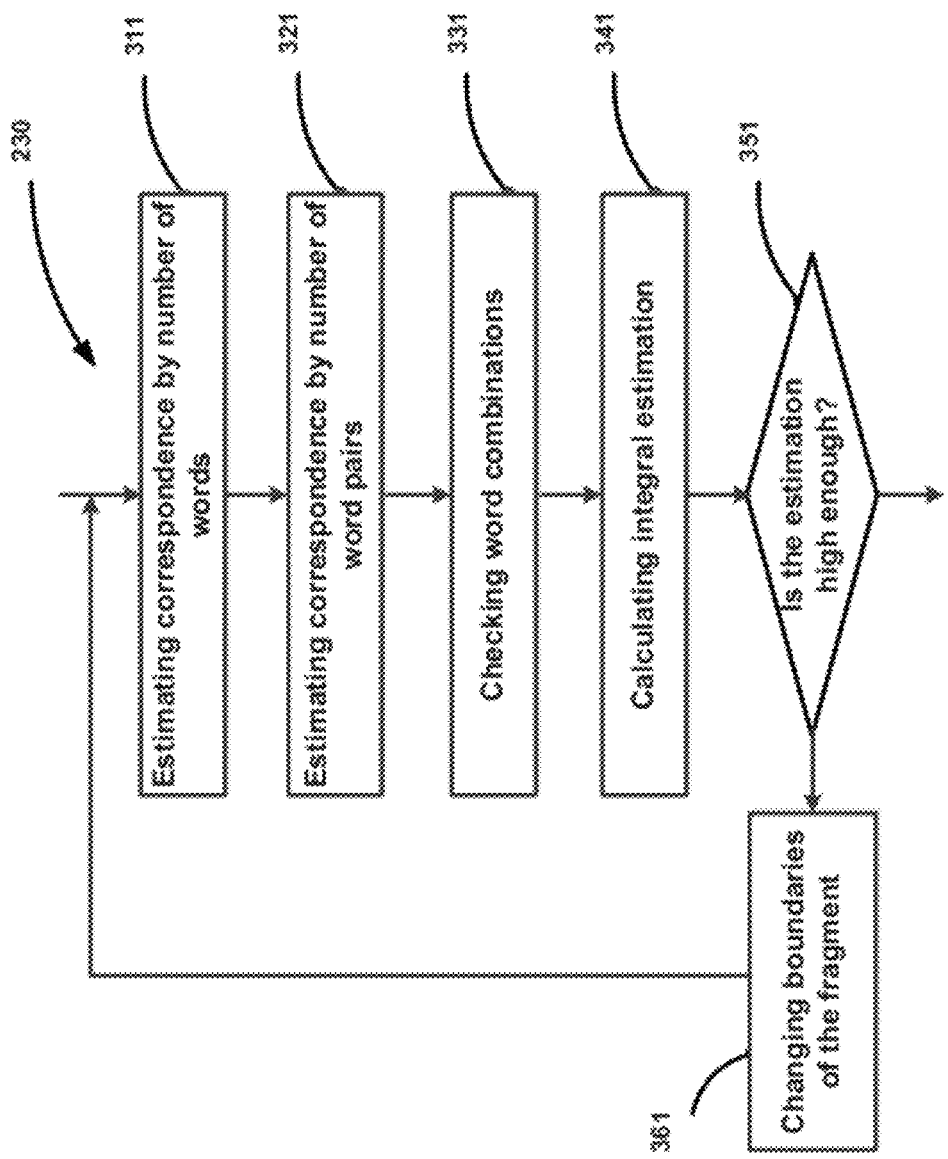

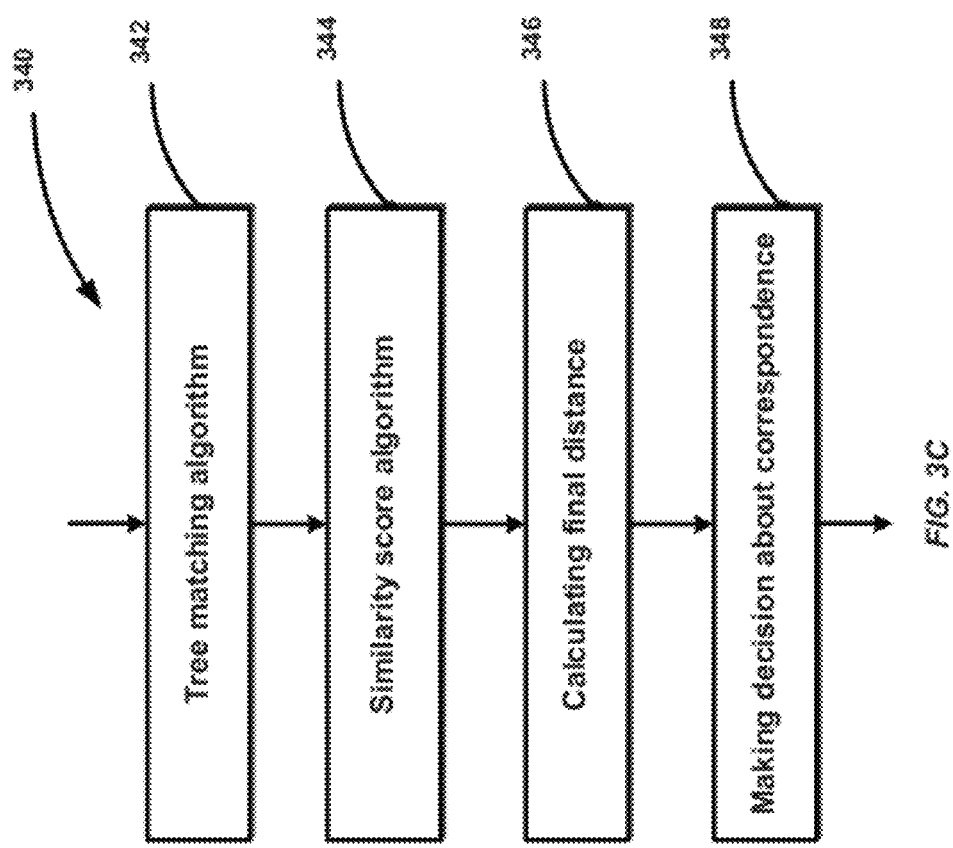

FIG. 13C

METHODS AND SYSTEMS FOR ALIGNMENT OF PARALLEL TEXT CORPORA

CROSS-REFERENCE TO RELATED APPLICATIONS

This application is a continuation-in-part of the U.S. patent application Ser. Nos. 11/690,102 and 11/690,104, both filed on 22 Mar. 2007, which are currently co-pending, and which are continuations-in-part of U.S. patent application Ser. No. 11/548,214, filed on 10 Oct. 2006, now U.S. Pat. No. 8,078,450. The disclosures of the above applications are incorporated herein by reference to the extent that such disclosures are not inconsistent with this application.

BACKGROUND OF THE INVENTION

1. Field

Embodiments relate to creating parallel text corpora which may be used, for example, in machine translation, machine learning, search technology, system of understanding of natural languages in AI. In particular, embodiments relate to automatic creation of aligned parallel natural languages corpora and tagged parallel corpora. Such electronic content may be available, for example, on the Internet and in other electronic resources.

2. Background

There is existing technology that generates parallel text corpora. A parallel text corpus refers to texts consisting of two or more parts—a text in one language and its translation in another language that is a translation of the first text. Parallel texts corpus may contain texts in two or more languages. An aligned parallel text additionally comprises a mapping (correspondence) of a portion of the first text into a portion of its translation, where the portion may be a sentence, a paragraph, or another part of the texts. An example of aligned parallel text is a translation memory or other databases of translations which can be created, for example, by translation agencies or by individual human translators. Applications, such as machine translation, machine learning, search technologies, system of understanding of natural languages in AI, may employ connected parallel texts, and, more importantly, parallel texts which comprise logical relations between sentences, such as referential relations, anaphoras, connectors and the like. Aligned and tagged parallel texts are very useful for these applications as well.

Usual methods of aligning parallel texts are chiefly manual, or based on heuristics, for example, aligning formally by boundaries of sentences which are identified by punctuation marks. But, such methods may be not sufficiently precise, because text formatting may complicate assumptions about sentence boundaries and because there are cases when one sentence is translated into two or more sentences in another language. Additionally, it is desirable to obtain tagged parallel texts where grammatical, lexical, and even syntactical and semantic features, as well as syntactic relationships or/and semantic relationships, are identified, and where grammatical and lexical meanings, deep or surface slots may be determined and searchable. While US Application Publication Number US20060217963 A1 mentions the use of Interlingua representation in connection with translation memory, it does not provide an effective way to generate and compare such representations, which are described as tree structures.

SUMMARY

The preferred embodiment preliminarily divides a text into fragments where a fragment may be a paragraph, a sentence or any other portion of a text; generates a hypotheses about correspondence between at least one fragment in one language and at least one fragment in another language; verifies hypotheses about correspondence between the fragments; and selecting at least one hypothesis.

There are various ways to verify the hypothesis about the correspondence between a fragment (e.g., a sentence) in one language and a fragment in another language. In one embodiment, a heuristic method using only two-language dictionaries may be used to estimate the degree of correspondence between the fragment in one language and the corresponding fragment in another language. In another embodiment, verifying the hypothesis about the correspondence between a fragment in one language and a fragment in another language includes performing a lexico-morphological analysis of each element of the fragment using linguistic descriptions; performing a syntactic analysis using linguistic descriptions to generate at least one syntactic structure for each sentence; building a semantic structure for each sentence; estimating the degree of correspondence between semantic structures of the sentence in one language and the corresponding sentence in another language.

If the degree of correspondence is sufficiently significant, the hypothesis may be considered confirmed, and the correspondence between the sentence in one language and the corresponding sentence in another language would be established. The system may associate and save the generated syntactic and semantic structures in connection with the corresponding sentence. Accordingly the sentences of the parallel texts and, if desired, individual words would be tagged with their linguistic descriptions and semantic structures generated during the analysis. As result, aligned tagged parallel text corpus is provided.

As noted, parallel text copra are useful in many applications. In machine translation, it may be effectively employed for resolving ambiguities and lexical choices in a sentence by means of comparison its semantic structure with semantic structures of corresponding sentences in various languages. Additionally, for each corpus of natural language texts that were analyzed, the system indexes lexical meanings and values of linguistic parameters of each syntactic structure and each semantic structure and its semantic parameters associated with sentences in the corpus. The tagged, indexed parallel text corpora can be searched more productively including using intelligent semantic searching. Thus, generally, the disclosed system and method employs a full-fledged automatic syntactic and semantic analysis when aligning and marking texts making it possible to index and store syntactic and semantic information about each sentence, as well as parsing results and lexical choices, including results obtained when resolving ambiguities.

BRIEF DESCRIPTION OF THE DRAWINGS

FIG. 3A illustrates a flowchart of verifying hypotheses about correspondence of text fragments.

FIG. 3C illustrates a flowchart of estimating the degree of correspondence between semantic structures of a sentence in one language and the corresponding sentence in another language.

FIG. 13A-13G illustrates a interface for using a parallel text system.

DETAILED DESCRIPTION

The preferred embodiments are implemented as a computer system that includes hardware and software as discussed in more detail below. The computer system can be a server, a personal computer, a mobile device, a distributed architecture, or any other computing environment suitable for supporting the functionality discussed herein.

Figure 1:
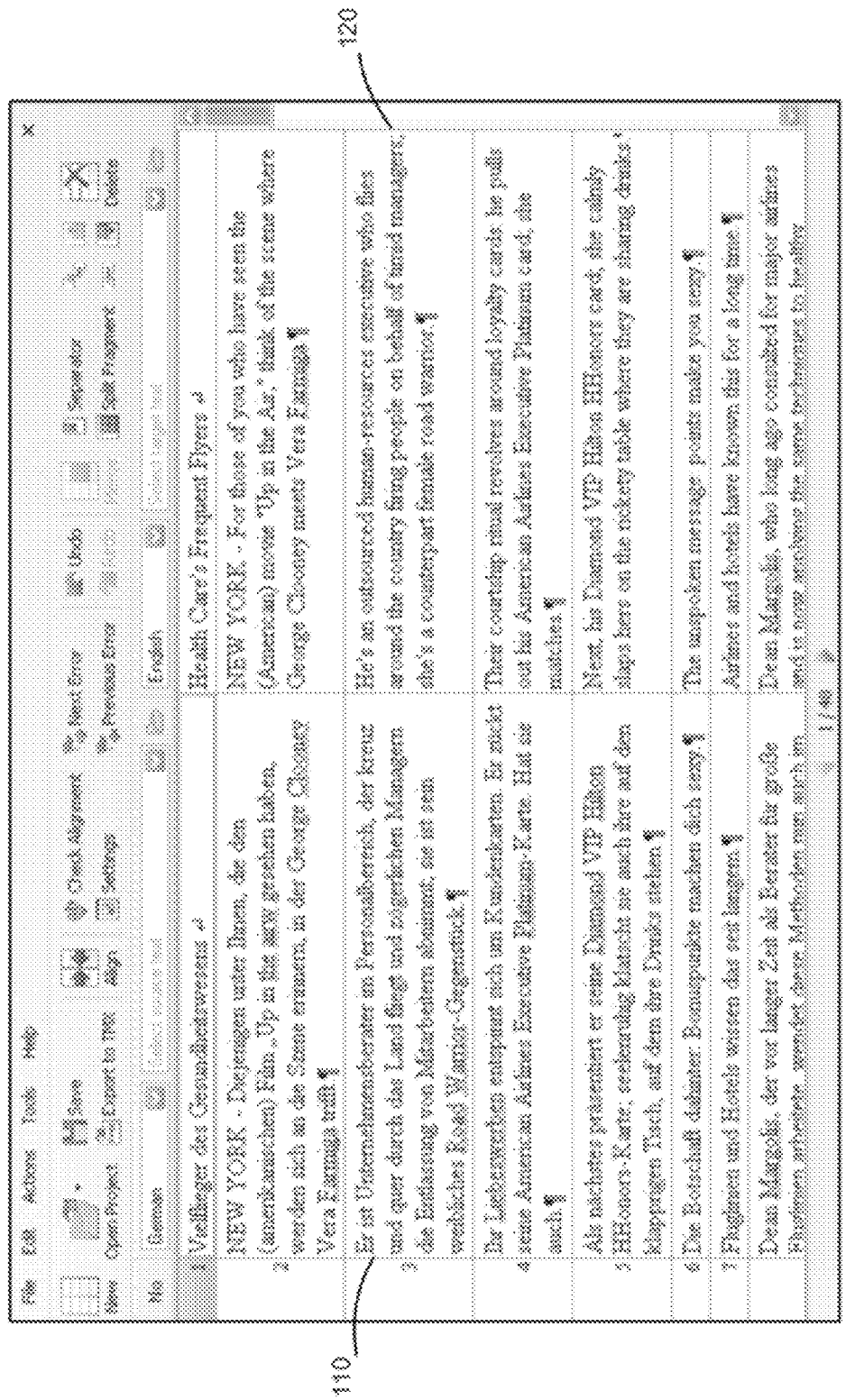
FIG. 1 shows an example of a system interface that allows a user to see a result of alignment of parallel texts, for example, German-English texts.

The preferred embodiments relate to techniques and systems for aligning parallel natural language text corpora. FIG. 1 shows an example of a system interface displaying alignment of parallel texts, in this instance, German-English texts. The interface includes window 110 for the text in the first language, which is divided into fragments by horizontal lines, and window 120 displaying corresponding fragments in a second language. The alignment is demarcated by the horizontal lines. As discussed subsequently, if needed, the user can correct the result of alignment manually.

Figure 2:
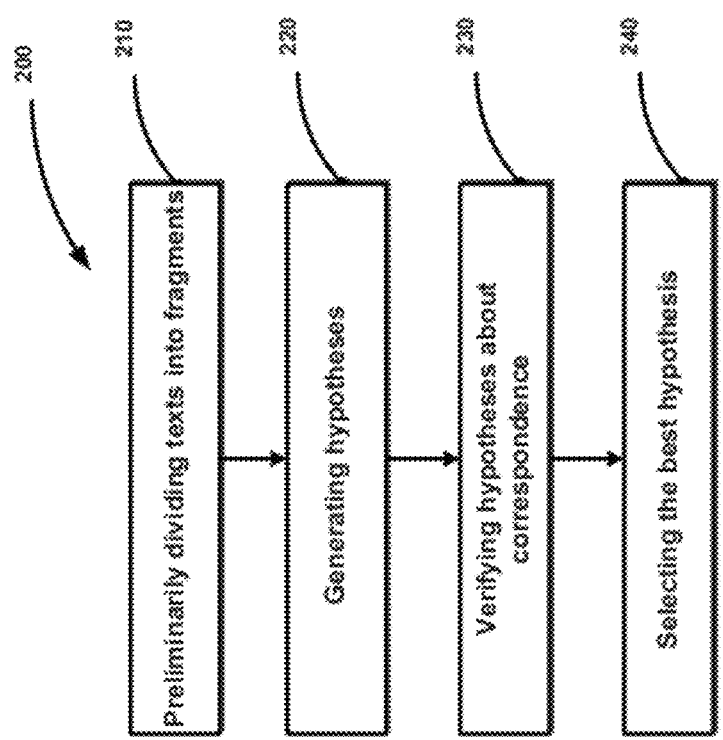
FIG. 2 illustrates a flowchart of a computer-implemented method for aligning two-language parallel texts.

FIG. 2 illustrates a flow chart of a computer-implemented method 200 for aligning two-language parallel texts. At step 210 the system automatically preliminarily divides the texts into fragments. The user can select what unit will be chosen as a "fragment." It may be a paragraph, a sentence or another unit of a text. Otherwise, the system may select a default value. As a result of step 210, each text is divided into a set of pairs of fragments. Presumably, subject to further verification, these fragments can be organized as corresponding pairs.

At step 220, hypotheses about correspondence between the fragments in one language to the fragments in another language are generated. The hypotheses may be generated using information about the size of fragments, punctuation symbols, formatting, capital letters, headings, numbering of text parts and paragraphs, and other characteristics of the texts. The system may generate several hypotheses about the fragment correspondence, since there may be several alternative ways of dividing the parallel texts into pairs of matching fragments.

At step 230, the system verifies the hypotheses about correspondence between the fragments in one language and fragments in another language. There are alternative approaches to verifying the hypothesis about the correspondence between a fragment in one language and a fragment in another language. In one embodiment, a heuristic method, using only two-language dictionaries, estimates the degree of correspondence between the fragments. The two-language dictionary may be created from a usual dictionary as a normalized one-to-one word dictionary, which can include all lexical values, homonyms and parts of speech. It also can include all word forms; otherwise, each word in a sentence should be subjected to morphological analysis. As part of verifying a hypothesis about the correspondence of the two fragments, an estimation of correspondence value is calculated. This value may be based on the relationship of the percentage of words with a translation in the corresponding fragment found in the dictionary to the sizes of the fragments and, optionally, to other parameters.

FIG. 3A illustrates a flowchart of verifying a hypotheses about the correspondence of fragments using this heuristic method. First, two selected fragments are compared (311) by the number of words in each fragment. Frequently a sentence in one language would include a different number of words then a corresponding sentence in another language. But, the difference is typically not significant (one number should not be several times larger or smaller than the other number). Thereafter, the system checks (321) the presence of two-language pairs in the two-language dictionary. Each pair comprises words from different languages found in the fragment. For example the system may consecutively look up words from a fragment in one language and then check if the translations found in the dictionary match the words of the presumably corresponding fragment in a different language. The ratio of the number of pairs identified by checking in the dictionary to the number of words in the fragment in one language may describe the degree of correspondence of two fragments.

Additionally, a presence of corresponding word combinations (331) in the two fragments may increase the confidence in the hypothesis, which may be reflected in the estimation value mentioned above. Some other heuristic factors, such as the presence of specific words, such as dates, numbers, abbreviations, names, e.g., family names and geographical names, and the like may be taking into consideration in determining the probability of the selection of a hypothesis. After all the estimations, including those discussed above, reflecting the segment correspondence had been taken into account, the degree of correspondence is calculated (341). In calculating the degree of correspondence value, the previously-discussed partial estimations are adjusted by using weight coefficients which may be selected on the basis of heuristics or training. If the accumulate estimation is sufficiently high (351), the hypothesis is confirmed, otherwise the system attempts to change (361) the boundaries of the fragment (for example, to unite two adjacent fragments) and then to attempt to verify the new hypothesis. There may be a limitation on the number of hypotheses related to a fragment that may be attempted. If the best hypothesis for the fragment still does not have a sufficiently high degree of correspondence, the fragment is marked by a color, so as to indicate that it should be correct manually. Referring to FIG. 2, after all or the most probable hypotheses have been considered, at step 240, the best hypothesis may be chosen.

Another embodiment involves analyzing exhaustive linguistic descriptions for verifying hypotheses 230 about the correspondence between a fragment in one language and a fragment in another language. The method of analyzing natural languages was disclosed in the U.S. patent application Ser. No. 11/548,214, filed on 10 Oct. 2006, now U.S. Pat. No.

8,078,450. It includes a lexico-morphological analysis, syntactic and semantic analysis and building a semantic structure for each sentence. The implementation of the method of analyzing natural languages allows retrieving and saving all lexico-morphological, syntactical and semantic information about a sentence, its parts, words and their relations in the sentence, meanings of words and meaning of the whole sentence, and even relations between sentences.

Figure 3B:
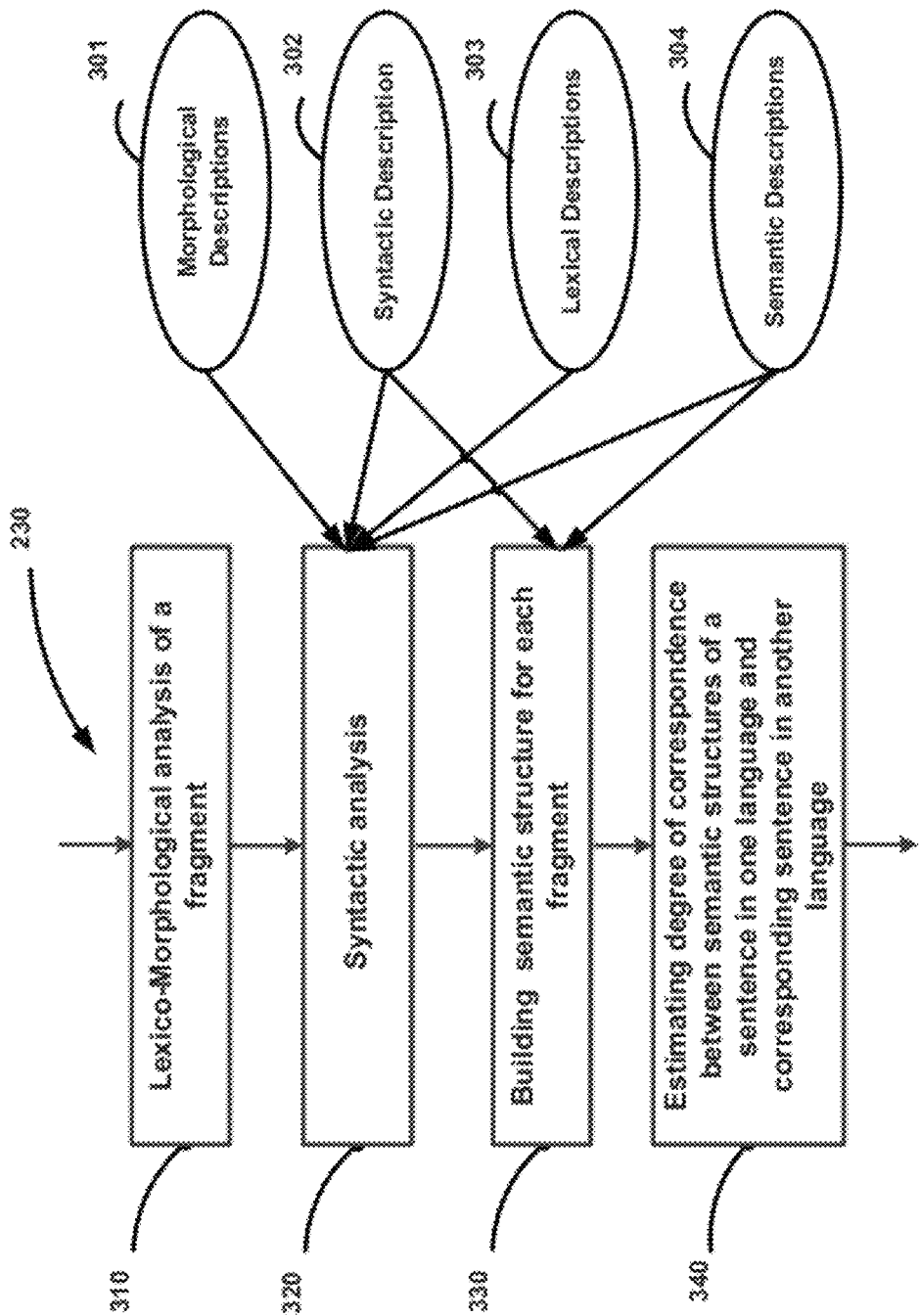
FIG. 3B illustrates a flow chart of verifying hypotheses about correspondence of text fragments linguistic descriptions.

FIG. 3B illustrates a flowchart of a computer-implemented method of verifying hypotheses 230 according the embodiment that analyses the fragments of both languages based on linguistic descriptions, which may include: morphological descriptions 301, syntactic descriptions 302, lexical descriptions, 303 and semantic descriptions 304. As illustrated in FIG. 3B, first the system performs lexico-morphological analysis 310 of each element of the fragments in each language using linguistic descriptions. Subsequently, at 320, a syntactic analysis is performed using linguistic descriptions to generate at least one syntactic structure for each fragment in the analyzed fragment pair. Then, at 330 the system builds a semantic structure for each fragment in the fragment pair. Finally at 340, the system estimates the degree of correspondence between semantic structures of a fragment in one language and corresponding fragment in another language. Various types of assessments and their combinations may be used for estimating of correspondence of semantic structures. For example, the system may employ a technique comprising a tree-matching algorithm and checking the correspondence of non-tree links. If the degree of correspondence is sufficient in comparison to a predetermined threshold value, the hypothesis may be considered confirmed, and the correspondence between each sentence in one language and the corresponding sentence in another language is established. As result, an aligned tagged parallel text corpus may be provided.

In one preferred embodiment the fragments are selected as sentences. As a result of the above processing, each sentence is associated with the generated syntactic and semantic structure. Preferably the structures are saved in connection with the sentences, so that the texts are annotated with the information and structures ascertained during the analysis Additionally, for each corpus of natural language texts that was analyzed, the system performs an indexing operation to index lexical meanings and values of linguistic parameters of each syntactic structure and each semantic structure and its semantic parameters associated with sentences in the corpus. The indexed text corpora are useful for information searching. The tagged indexed parallel text corpora are useful for intelligent semantic search.

As noted, the preferred system employs automatic syntactic and semantic analysis when aligning and marking texts. It indexes and stores syntactic and semantic information about each sentence, as well as parsing results and lexical choices, including results obtained when resolving ambiguities. The system analyzes sentences using linguistic descriptions of a given natural language to reflect the real complexities of the natural language, rather than simplified or artificial descriptions. A principle of integral and purpose-driven recognition, where hypotheses about the structure of a part of a sentence are verified within the hypotheses about the structure of the whole sentence, is implemented during the analysis stage. It avoids analyzing numerous parsing of anomalous variants.

The linguistic descriptions may include morphological descriptions 301, syntactic descriptions 302, lexical descriptions, 303 and semantic descriptions 304. In one implementation, a plurality of linguistic models and knowledge about natural languages may be arranged in a database and applied for analyzing each text sentence. Such a plurality of linguistic models may include morphology models, syntax models, grammar models and lexical-semantic models. In a particular implementation, integral models for describing the syntax and semantics of a language are used in order to recognize the meanings of the sentence, analyze complex language structures, and correctly convey information encoded in the sentence.

When analyzing the meaning of the sentence, syntactic analysis 320 realizes a two-step analysis algorithm (e.g., rough syntactic analysis and precise syntactic analysis) implemented to make use of linguistic models and knowledge at various levels, to calculate probability ratings and to generate the most probable syntactic structure, e.g., a best syntactic structure.

Figure 4:
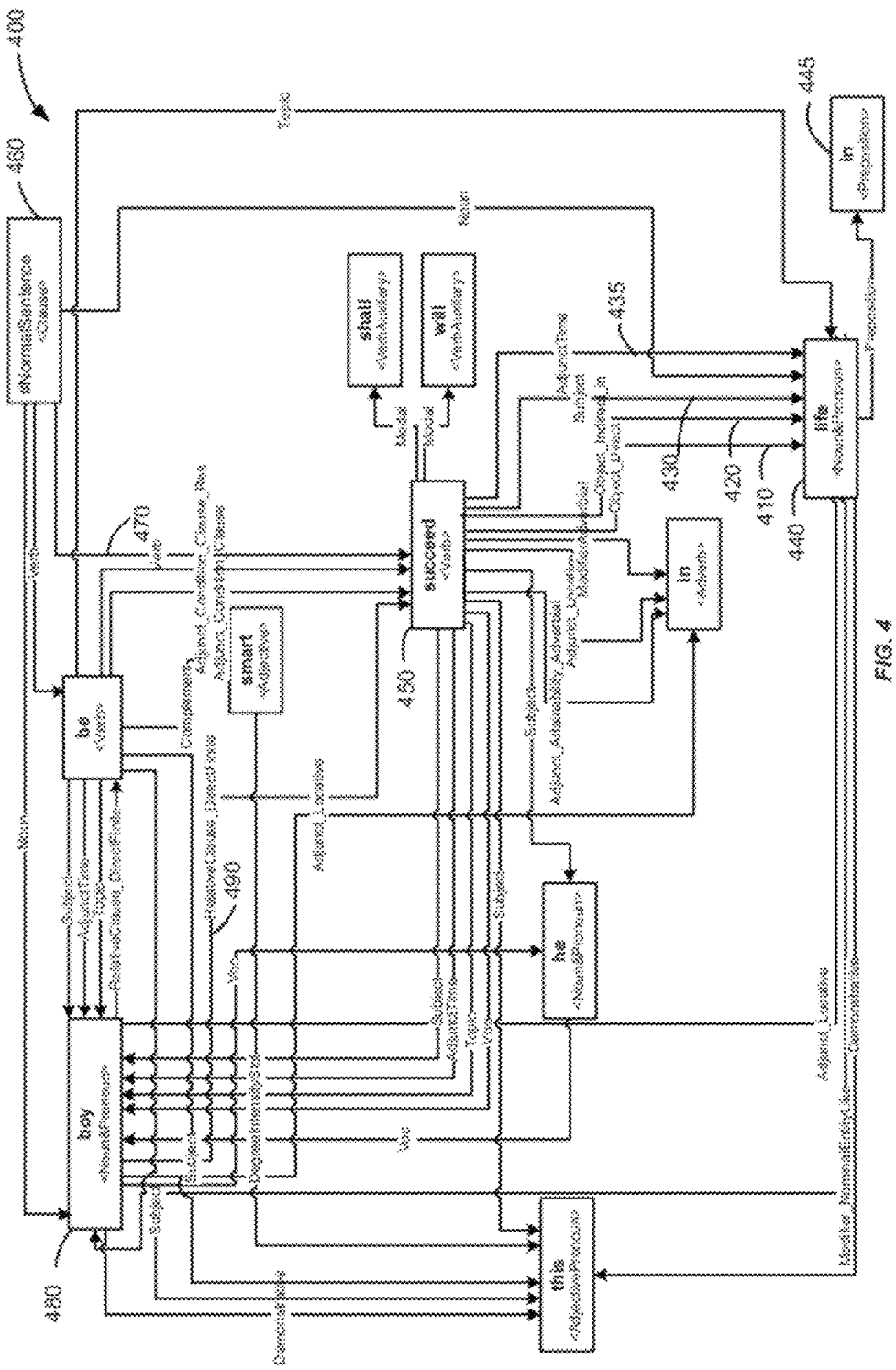
FIG. 4 illustrates an example of a graph of generalized constituents obtained as a result of an initial ("rough") syntactic analysis of a sentence.

Accordingly, a rough syntactic analysis is performed on the sentence to generate a graph of generalized constituents for further syntactic analysis. All the possible surface syntactic models for each element of lexical-morphological structure are applied, and all the possible constituents are built and generalized to represent all the possible variants of parsing the sentence syntactically. FIG. 4 illustrates an example of a graph of generalized constituents obtained as a result of rough syntactic analysis of the sentence "This boy is smart, he'll succeed in life."

Figure 5:
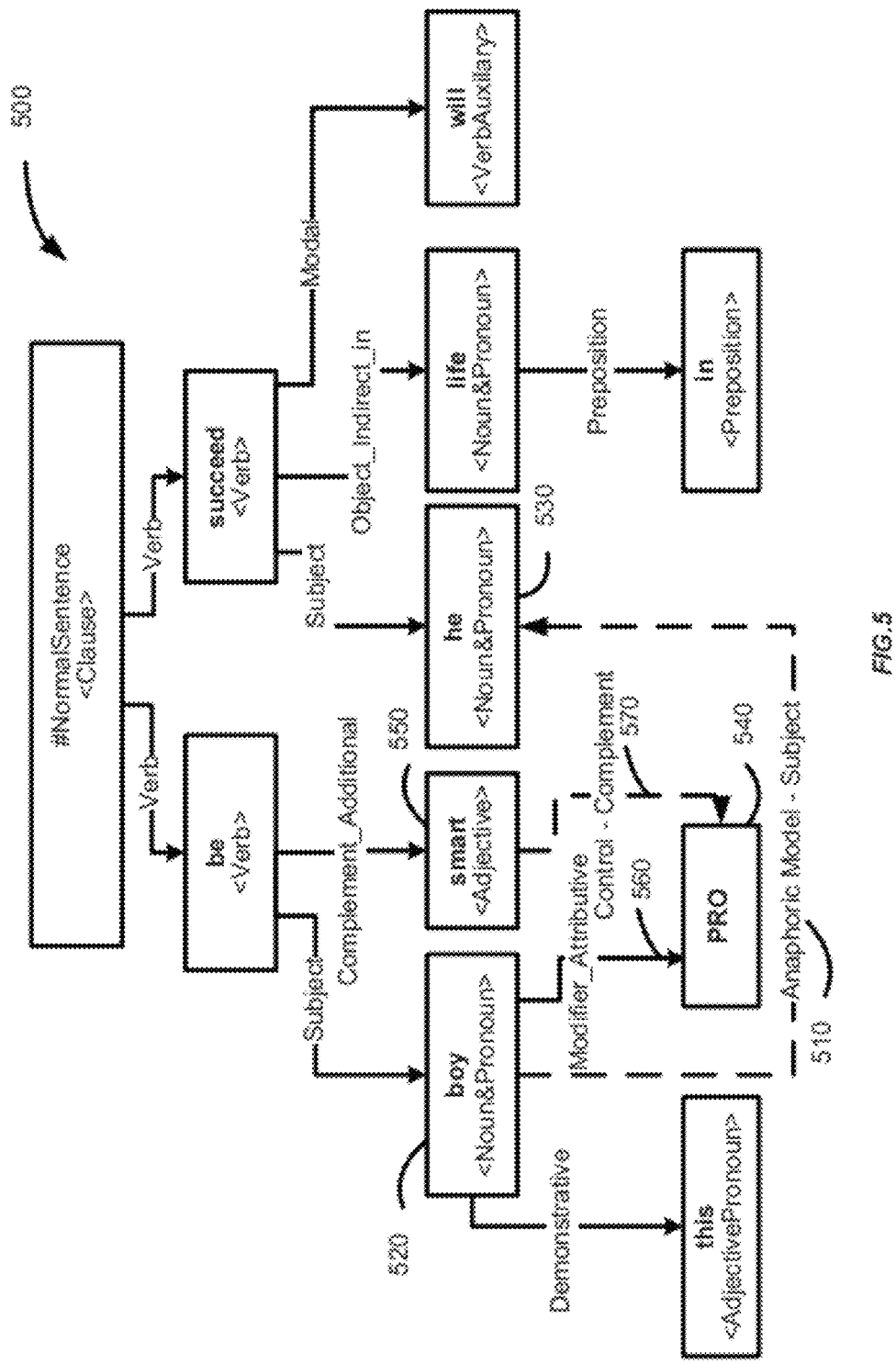
FIG. 5 shows an example of a syntactic tree, obtained as a result of a subsequent ("precise") syntactic analysis of a sentence.

Following the rough syntactic analysis, a precise syntactic analysis is performed on the graph of generalized constituents to generate one or more syntactic trees to represent the source sentence. In one implementation, generating the syntactic tree comprises choosing between lexical options and choosing between relations from the graphs. Many prior and statistical ratings may be used during the process of choosing between lexical options, and in choosing between relations from the graph. The prior and statistical ratings may also be used for assessment of parts of the generated tree and for the whole tree. In one implementation, the one or more syntactic trees may be generated in order of decreasing assessment. Thus, the best syntactic tree may be generated first. Non-tree links are also checked and generated for each syntactic tree at this time. If the first generated syntactic tree fails, for example, because of impossibility to establish non-tree links, the second syntactic tree is taken as the best, etc. FIG. 5 shows an example of a syntactic tree 500, obtained as a result of precise syntactic analysis of the sentence "This boy is smart, he'll succeed in life." This tree contains complete syntactic information, such as lexical meanings, parts of speech, syntactic roles, grammatical values, syntactic relations (slots), syntactic models, non-tree link types, etc.

This novel two-step syntactic analysis approach ensures that the meaning of the source sentence is accurately represented by the best syntactic structure chosen from the one or more syntactic trees. Advantageously, the two-step analysis approach follows a principle of integral and purpose-driven recognition, i.e., hypotheses about the structure of a part of a sentence are verified using all available linguistic descriptions within the hypotheses about the structure of the whole sentence. This approach avoids a need to analyze numerous parsing anomalies or variants known to be invalid.

With reference to FIG. 3B, at step 330, after the sentence has been analyzed, the syntactic structure of the sentence is semantically interpreted, and a language-independent semantic structure is constructed to represent the meaning of the sentence. The language-independent semantic structure is a generalized data structure in a language-independent form. Such language-independent semantic structure is generated for each sentence to accurately describe the meaning of the sentence and to reflect grammatical, lexical and syntactic features in language-independent terms. The novel language-independent semantic structure can be applied to various applications, including, but not limited to, automated abstracting, machine translation, control systems, information retrieval, or search, as well as alignment of parallel corpora.

Figure 6:
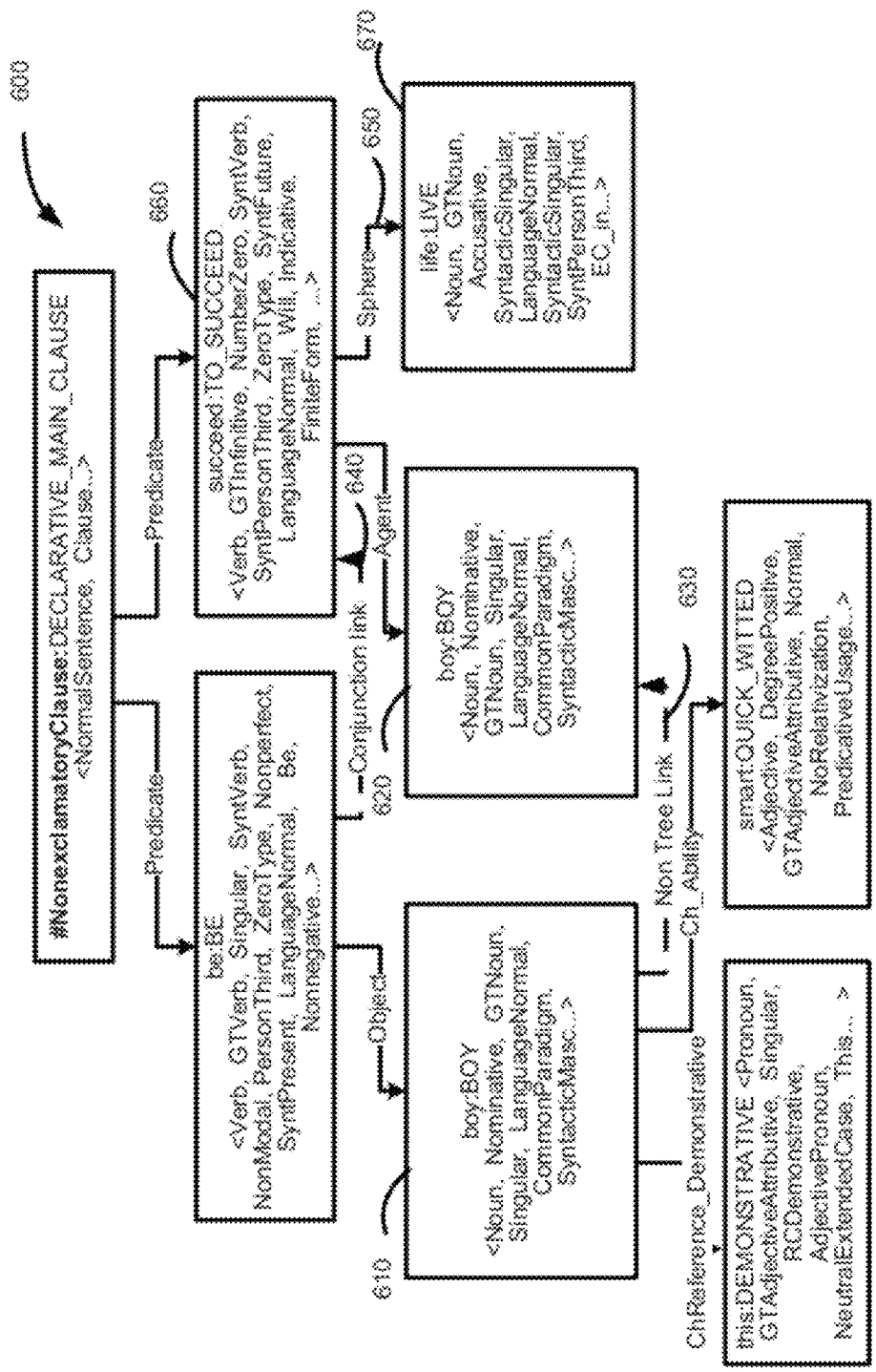
FIG. 6 shows an example of a semantic structure obtained for a sentence.

The disclosed analysis methods ensure that the maximum accuracy in conveying or understanding the meanings of the sentence is achieved. FIG. 6 shows an example of a semantic structure, obtained for the sentence "This boy is smart, he'll succeed in life." This structure contains all syntactic and semantic information, such as semantic class, semantemes, semantic relations (deep slots), non-tree links, etc.

Figure 7:
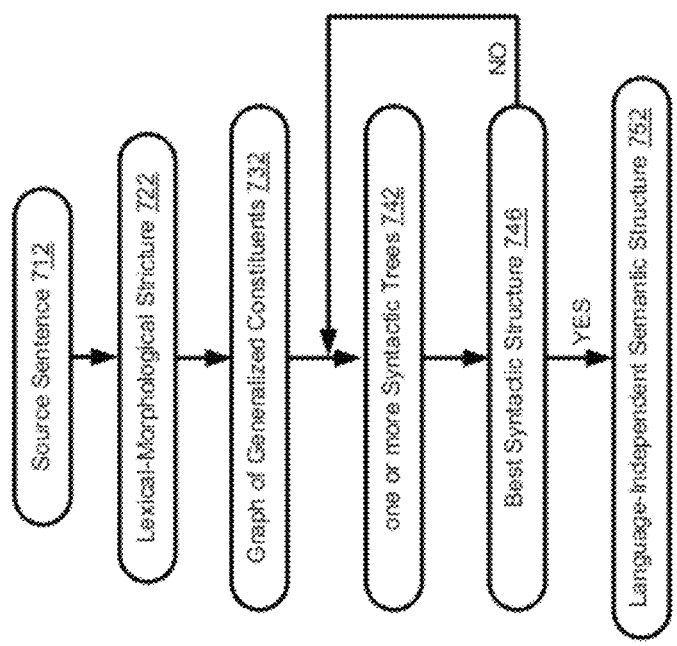
FIG. 7 illustrates converting a source sentence into a language-independent semantic structure through various structures and according to linguistic descriptions.

FIG. 7 illustrates a method to convert a source sentence 712 into a language independent semantic structure 752 through various structures according to an exemplary implementation of the invention and the linguistic descriptions employed. A lexical-morphological structure 722 is created from a sentence (each sentence in corpora). A graph of generalized constituents is created 732. Next, one or more syntactic trees are created 742. A best syntactic structure is selected 746. If a best one is not found, the method iterates until a best syntactic structure is identified (or until the possibilities have been exhausted). Indices of syntactic features may be generated after this step. Once a best syntactic structure is identified and selected, a language-independent semantic structure is created 752. After this step indices of semantic features are may be generated.

Figure 8:
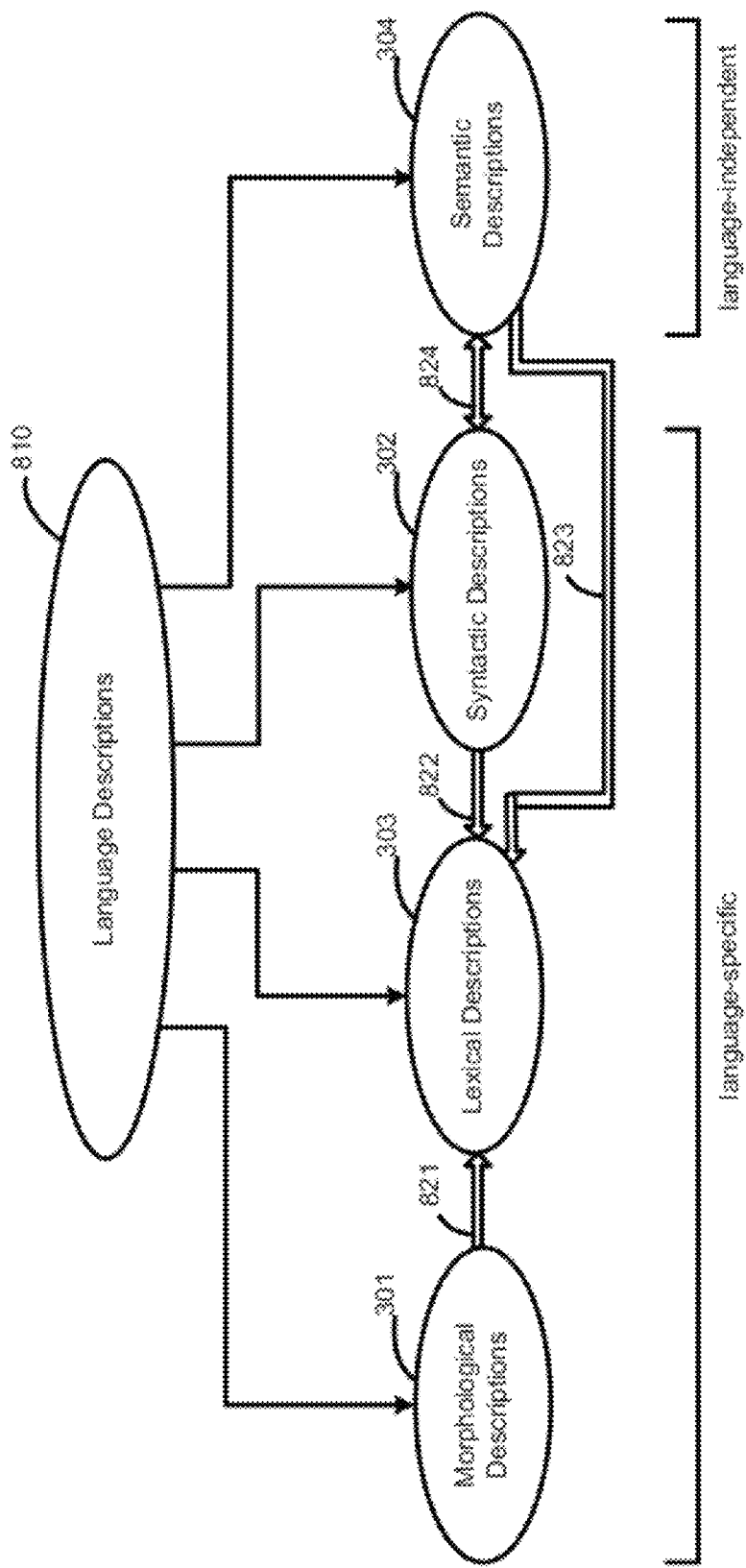
FIG. 8 illustrates exemplary linguistic descriptions.

FIG. 8 is a diagram illustrating language descriptions 810 according to one exemplary implementation of the technology. With reference to FIG. 8, language descriptions 810 comprise morphological descriptions 301, syntactic descriptions 302, lexical descriptions, 303 and semantic descriptions 304. Language descriptions 810 are joined into one common concept. The core of the language descriptions 810 is a Semantic Hierarchy, which links together language-independent semantic descriptions 304 and language-specific, lexical descriptions 303, morphological descriptions 301, and syntactic descriptions 302 for each language.

Semantic hierarchy may include semantic notions or semantic entities referred to herein as "semantic classes". The semantic classes may be arranged into a semantic hierarchy comprising hierarchical parent-child relationships. In general, a child semantic class inherits most properties of its direct parent and all ancestral semantic classes. For example, semantic class SUBSTANCE is a child of semantic class ENTITY and at the same time it is a parent of semantic classes GAS, LIQUID, METAL, WOOD MATERIAL, etc.

Each semantic class in the semantic hierarchy is supplied with a deep model. The deep model of the semantic class is a set of the deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

Semantic descriptions 304 are language-independent. Semantic descriptions 304 may provide descriptions of deep constituents, and may comprise a semantic hierarchy, deep slots descriptions, a system of semantemes, and pragmatic descriptions.

Figure 11:
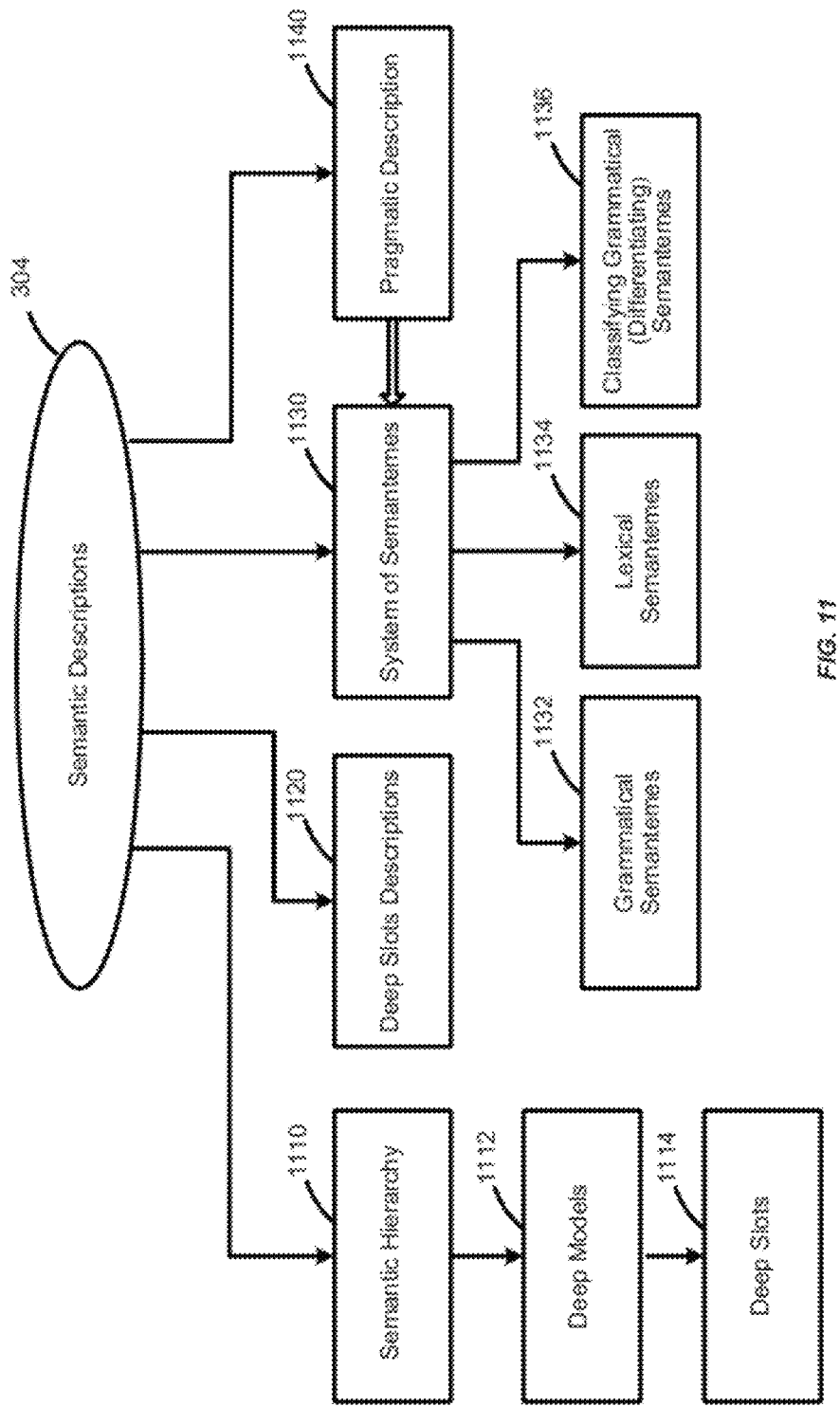
FIG. 11 illustrates exemplary semantic descriptions.

FIG. 11 is a diagram illustrating semantic descriptions according to one exemplary implementation of the technology. Deep slots 1114 reflect the semantic roles of child constituents in the deep models 1112. The deep slots descriptions 1120 also contain grammatical and semantic restrictions on possible fillers of the deep slots. The properties and restrictions for the deep slots 1114 and their possible fillers are very similar and oftentimes identical among different languages.

A system of semantemes represents a set of semantic categories. As an example, a semantic category "DegreeOfComparison" can be used to describe the degrees of comparison expressed by various forms of adjectives, for example, "easy", "easier" and "easiest". So, the semantic category "DegreeOfComparison" may include such semantemes as, for example, "Positive", "ComparativeHigherDegree", "SuperlativeHighestDegree", among others. As another example, a semantic category "RelationToReferencePoint" can be used to describe an order as before or after a reference point relative to some event or object, etc., and its semantemes may include, "Previous", "Subsequent", and the order may be spatial or temporal in a broad sense. As yet another example, "EvaluationObjective", as a semantic category, may describe an objective assessment, such as "Bad", "Good", etc.

The systems of semantemes include language-independent semantic attributes that express semantic characteristics as well as stylistic, pragmatic and communicative characteristics. Semantemes can also be used to express an atomic meaning that finds a regular grammatical and/or lexical expression in a language. By purpose and usage, semantemes may be divided into various kinds, including, but not limited to, grammatical semantemes, lexical semantemes, and classifying grammatical (differentiating) semantemes.

Grammatical semantemes 1132 are used to describe grammatical properties of constituents when transforming a syntactic tree (a language dependent object) into a semantic structure. Lexical semantemes 1134 describe specific properties of objects (for example, "being flat" or "being liquid") and are used in the deep slot descriptions 1120 as restriction for deep slot fillers (for example, for the verbs "face (with)" and "flood", respectively). Classifying grammatical (differentiating) semantemes 1136 express differentiating properties of objects within a single semantic class. For example, in the semantic class "HAIRDRESSER" the semanteme <<RelatedToMen>> is assigned to the lexical meaning "barber", unlike other lexical meanings which also belong to this class, such as "hairdresser", "hairstylist", etc.

Pragmatic descriptions 1140 are used to assign a corresponding theme, style or genre to texts and objects of the semantic hierarchy. For example, "Economic Policy", "Foreign Policy", "Justice", "Legislation", "Trade", "Finance", etc.

With reference to FIG. 8, the morphological descriptions 301, the lexical descriptions 303, the syntactic descriptions 302, and the semantic descriptions 304 may be related. A lexical meaning may have one or more surface (syntactic) models that may be provided by semantemes and pragmatic characteristics. The syntactic descriptions 302 and the semantic descriptions 304 are also related. For example, diatheses of the syntactic descriptions 302 can be considered as the "interface" between the language-specific surface models and language-independent deep models of the semantic description 304.

Figure 9:
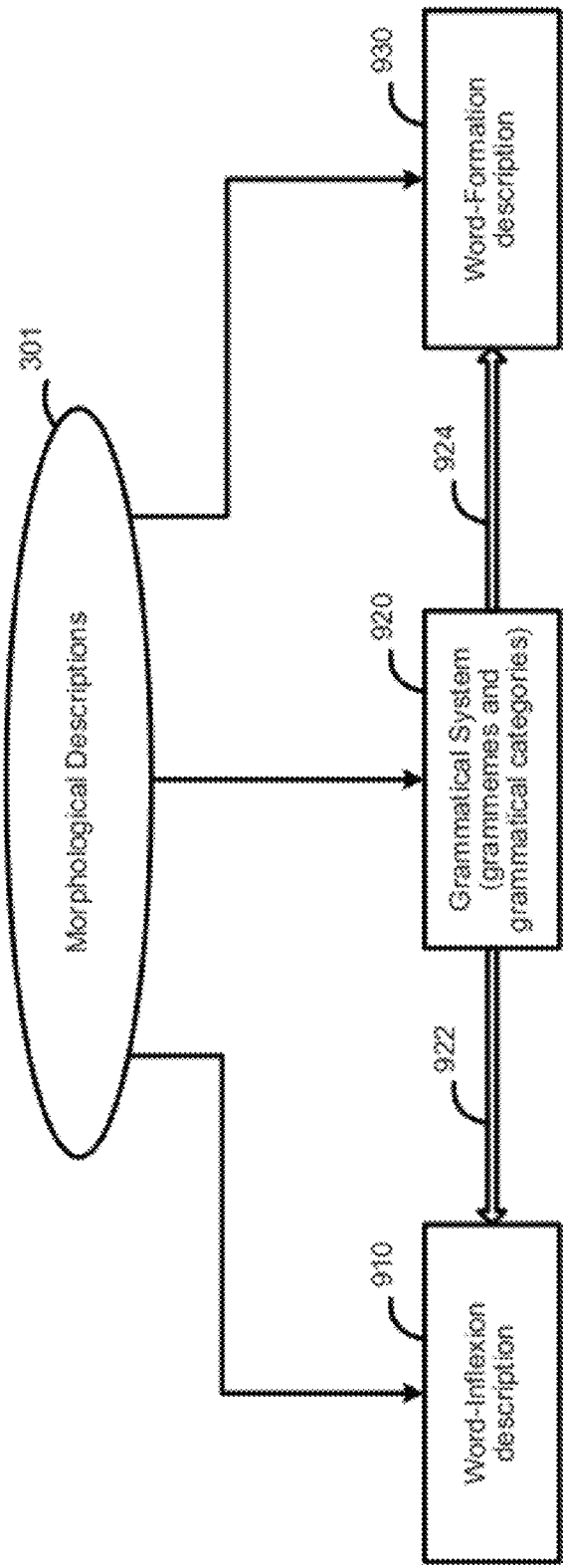
FIG. 9 illustrates exemplary morphological descriptions.

FIG. 9 illustrates exemplary morphological descriptions 301. As shown, the components of the morphological descriptions 301 include, but are not limited to, word-inflexion description 910, grammatical system (e.g., grammemes) 920, and word-formation description 930. In one embodiment, grammatical system 920 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

Word-inflexion description 910 describes how the main form of a word form may change according to its case, gender, number, tense, etc. and broadly includes all possible forms for a given word. Word-formation 930 describes which new words may be generated involving a given word. The grammemes are units of the grammatical systems 920 and, as shown by a link 922 and a link 924, the grammemes can be used to build the word-inflexion description 910 and the word-formation description 930.

Figure 10:
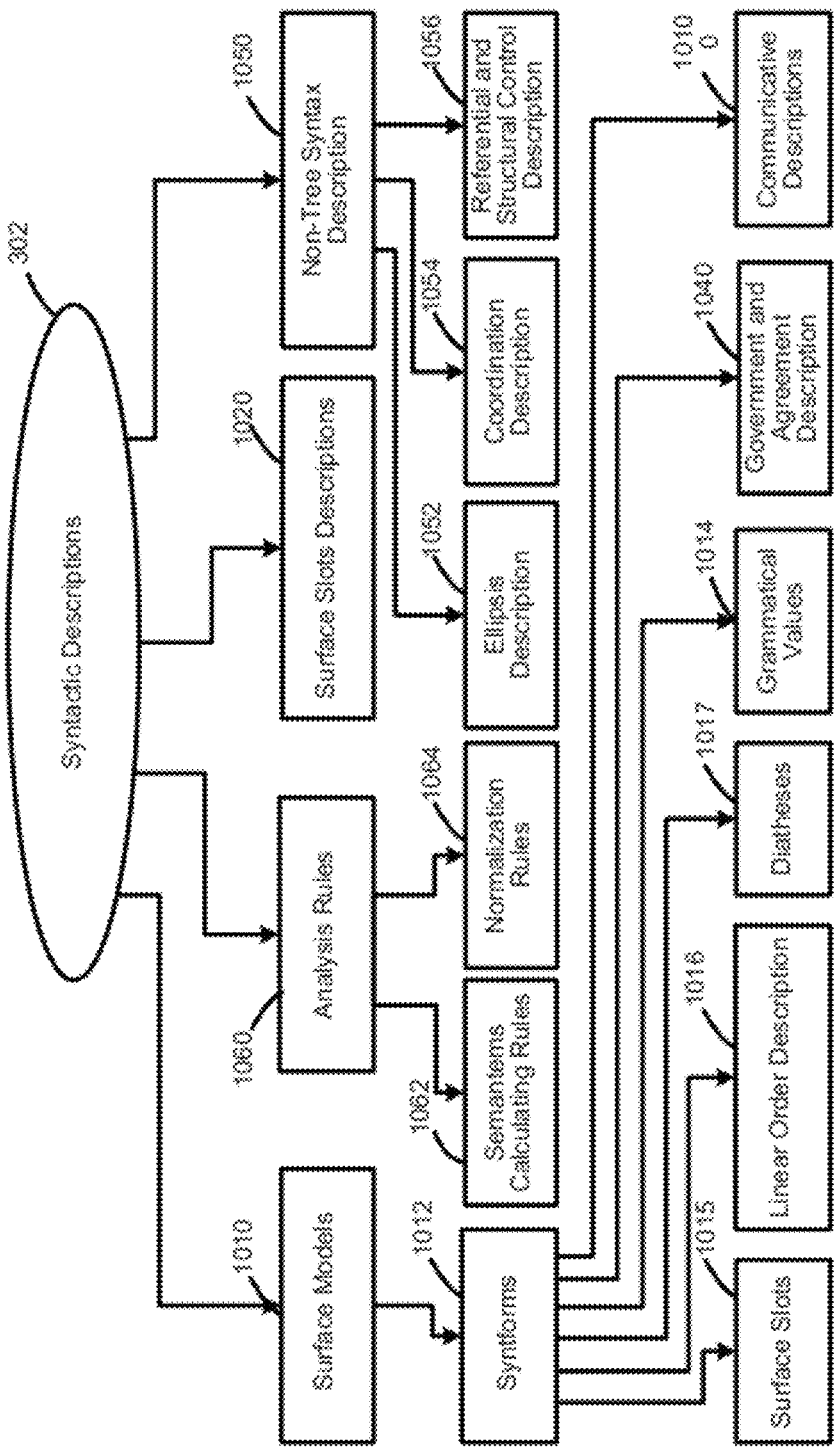
FIG. 10 illustrates exemplary syntactic descriptions.

FIG. 10 illustrates exemplary syntactic descriptions 302. The components of the syntactic descriptions 3502 may comprise surface models 1010, surface slot descriptions 1020, referential and structural control descriptions 1056, government and agreement descriptions 1040, non-tree syntax descriptions 1050, and analysis rules 1060. The syntactic descriptions 302 are used to construct possible syntactic structures of a sentence from a given source language, taking into account free linear word order, non-tree syntactic phenomena (e.g., coordination, ellipsis, etc.), referential relationships, and other considerations.

Figure 12:
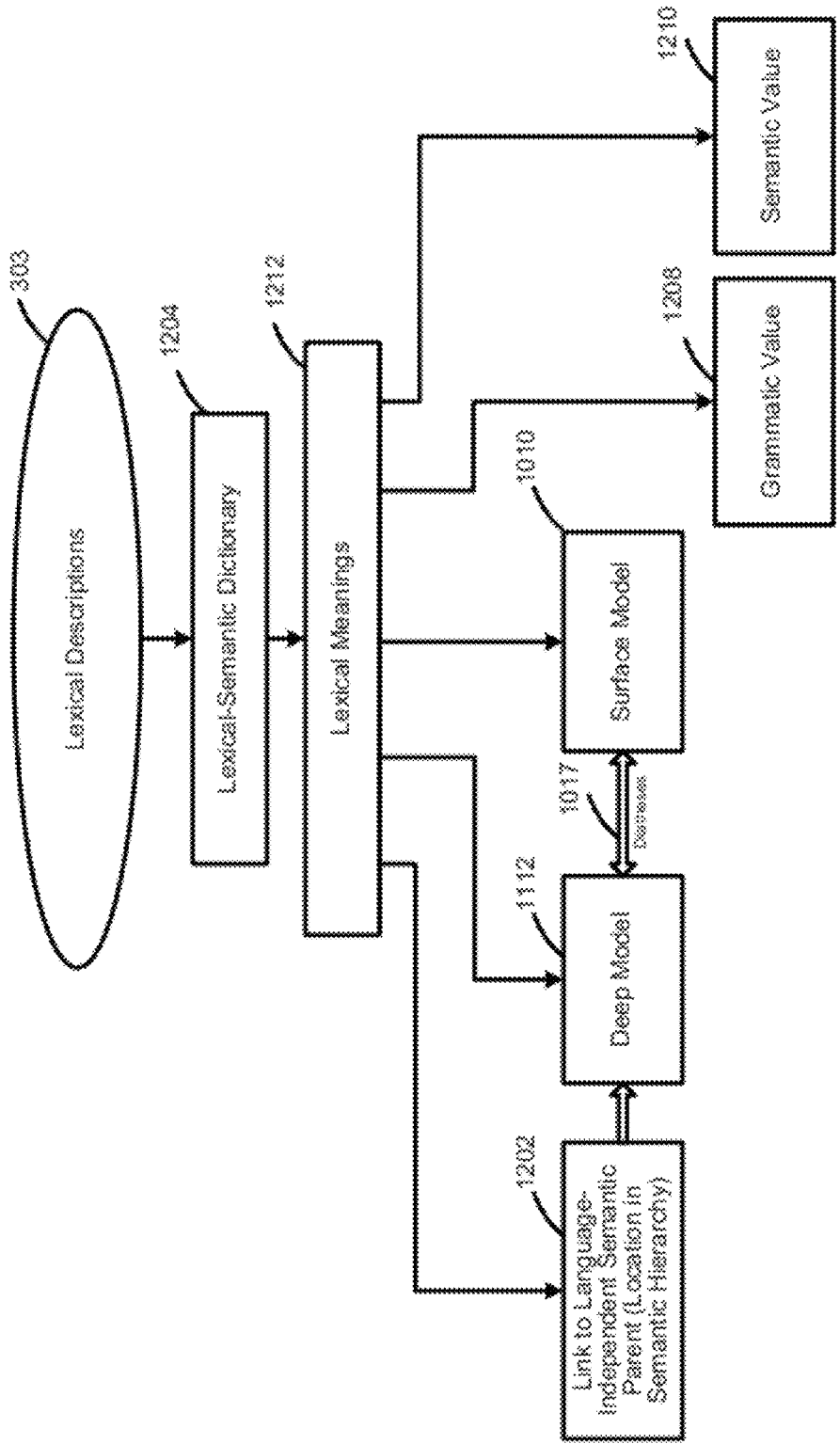
FIG. 12 illustrates exemplary lexical descriptions.

FIG. 12 is a diagram illustrating lexical descriptions 303 according to one exemplary implementation of the technology. The lexical descriptions 303 include a Lexical-Semantic Dictionary 1204 that contains a set of lexical meanings 1212 arranged with their semantic classes into a Semantic hierarchy 1110, where each lexical meaning 1212 may include, but is not limited to, its deep model 1112, surface model 810, grammatical value 1208 and semantic value 1210.

Referring to FIG. 3B, to verify a hypothesis about correspondence, after semantic structures for both, left and right sentences in a pair, have been built, the step of estimating 340 the degree of correspondence between semantic structures of a sentence in one language and the corresponding sentence in another language is executed.

There may be various types of assessments and their combinations for estimating of correspondence of semantic structures. For example, the structural similarity of semantic trees (structure), presence of corresponding non-tree links, correspondence of the semantic classes for the main parts of sentence and their semantic roles (deep slots), such as, for example, Agent (Subject), Predicate (Head), Object, etc., and subordinate parts of the sentence, such as Instrument, Goal, Direction, Location, Time, etc. So, the degree of correspondence may be expressed by a number of assessments. A semantic structure is a directional acyclic graph, with nodes that are assigned the elements of the Semantic Hierarchy. In certain simple cases, it may be a tree (semantic tree) representing semantic structure of the parsed sentence. However, certain constituents of a sentence may be connected by non-tree links.

The non-tree links may reflect various linguistic phenomena, such as, ellipsis and coordination. They are presented in syntactic structures which are generated during various steps of analysis. Ellipsis is a language phenomenon which is represented by the absence of core constituents. An example of an elliptical English sentence is "The president signed the agreement and the secretary [signed] the protocol".

Ellipsis can also be related to the coordination. Coordination is a language phenomenon which is presented in sentences with enumeration and/or a coordinating conjunction, such as "and", "or", "but", etc. A simple example of a sentence with coordination—"John, Mary and Bill came home". In this case only one of coordinated child constituent is attached in the surface slot of a parent constituent during building the graph of the generalized constituents. During the coordination processing, the linear order and multiple filling possibility of the surface slot are determined. If the attachment is possible, a proform which refers to the common child constituent is created and attached. The other examples of non-tree links are referential and structural control, among others.

Referring to FIG. 6, the conjunction non-tree link 640 connects two parts of the complex sentence "This boy is smart, he'll succeed in life." Also, referential non-tree link 630 connects two constituents 610 and 620. This non-tree link reflects anaphoric relation between the words "boy" and "he" to identify the subjects of the two parts of the complex sentence. This relation (510) is also shown on syntactic tree (FIG. 5) after syntactic analysis and establishing non-tree links. Additionally, a proform PRO 540 is inserted to establish a link between the controller ("boy") 520 and the controlled element ("smart") 550. As a result, the complement "smart" 550 fills the surface slot "Modifier_Attributive" 560 of the controller "boy" 520 by means of a link of type "Control-Complement" 570.

FIG. 3C illustrates a flowchart of an exemplary algorithm of estimating degree of correspondence between semantic structures of a sentence in one language and the corresponding sentence in another language according to the embodiment of the invention using linguistic descriptions. To reduce ambiguity in parsing and to accelerate the process, the parsing of two corresponding sentences according to a hypothesis may run in parallel, i.e. the parsing of both sentences are executed substantially simultaneously to produce coordinated structures, if possible.

A graph matching algorithm (342) is adapted to process pairs of sentences of two languages. The sentence graph nodes are mapped to produce a partial set of node pairs (some nodes do not have a pair). A similarity score algorithm (344) goes through the mapped set of nodes of acyclic graphs and calculates nodes distance in terms of, for example, values between zero and one. In this case, zero represents a complete match and one represents that there is no relationship between the nodes of two structures in the semantic hierarchy. For example, the notions represented by the nodes may be equal, non-vocabulary text may be exactly equal or case-insensitive equal, one node may be a parent of another one in the semantic hierarchy, or the nodes may be further removed but still related in the hierarchy. The distance values may be calculated based on training data by using an optimization procedure. For example, the Differential Evolution optimization algorithm may be used. Finally, when all the node distances have been computed, they are added to produce the final distance (346), which represents the degree of correspondence.

If the degree of correspondence is sufficient for the hypothesis to be considered confirmed (348), the correspondence between the sentence in one language and the corresponding sentence in another language has been established. If the hypothesis is not confirmed, the system tries to change the boundaries of the fragment and to verify the next hypothesis. If the best hypothesis for the fragment had not been found, the fragment is marked by color, and the user is provided with an option to correct it manually. As a result of applying this process to each pair of fragments, aligned tagged parallel text corpus is obtained.

Marking may be displayed to a user or may be hidden. Such marking may be used for indexing and searching. When marking is displayed to a user, various notations may be used. For example, an XML-like or a tree-like notation may be used. More specific notation may be provided, for example, as subscript. Some features may be selected by a user for displaying, such as, parts of speech, syntactic roles, semantic roles, semantic classes, etc.

Figure 13:
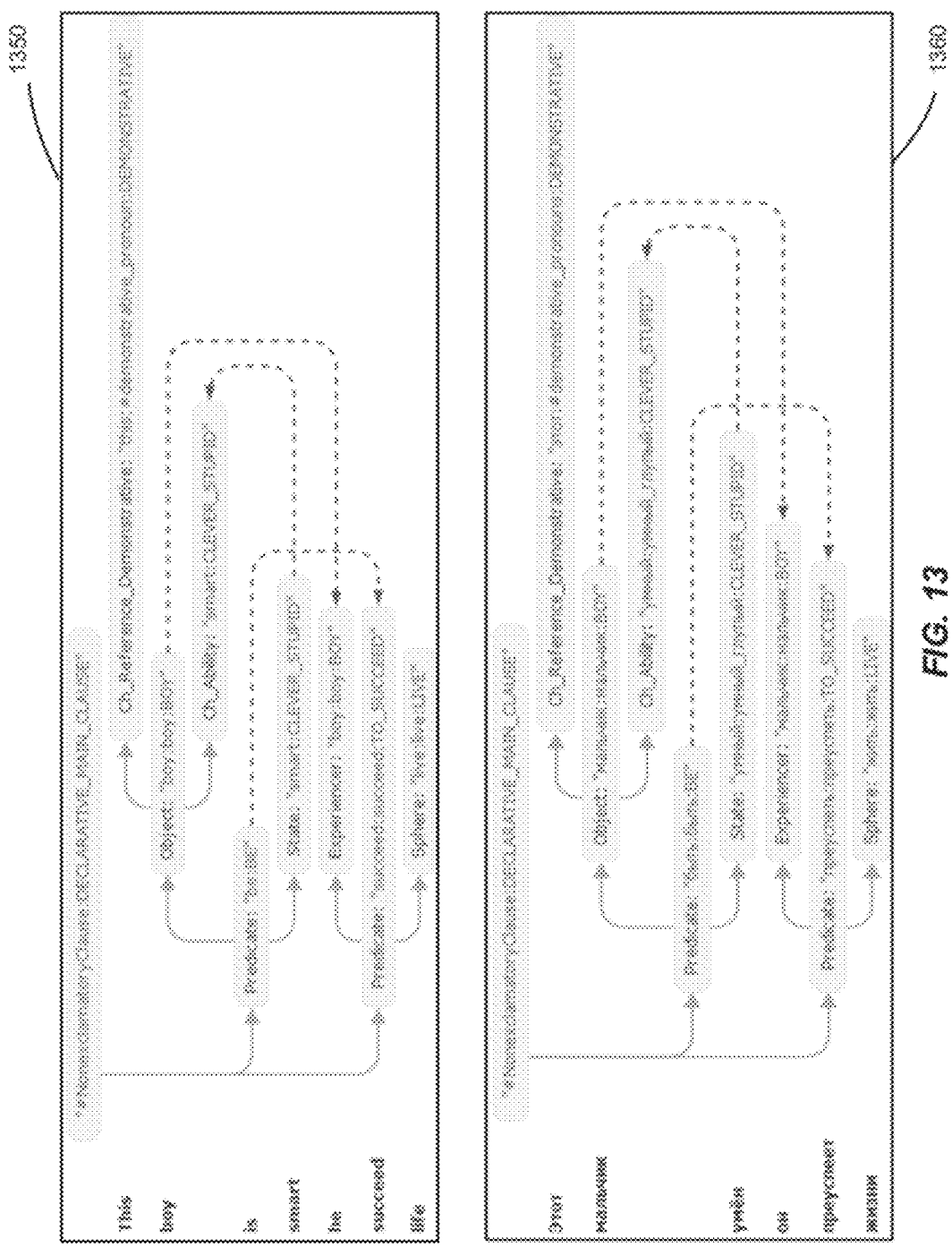
FIG. 13 demonstrates semantic structures of two sentences in two different languages in tree-like notation.

FIG. 13 illustrates the display of semantic structure graphs and demonstrates that two sentences in two different languages can have the same semantic structure. The upper window 1350 depicts the semantic structure of English sentence "This boy is smart, he'll succeed in life." in tree-like notation identifying semantic classes of nodes and deep slots. The window 1360 depicts the semantic structure of a Russian sentence "Этот мальчик умён он преуспеет в жизни." Since these sentences are the translations of each other, they have the same semantic structures where the trees match, and semantic classes and deep slots coincide. Also, both sentences have the same non-tree links.

Figure 13A:
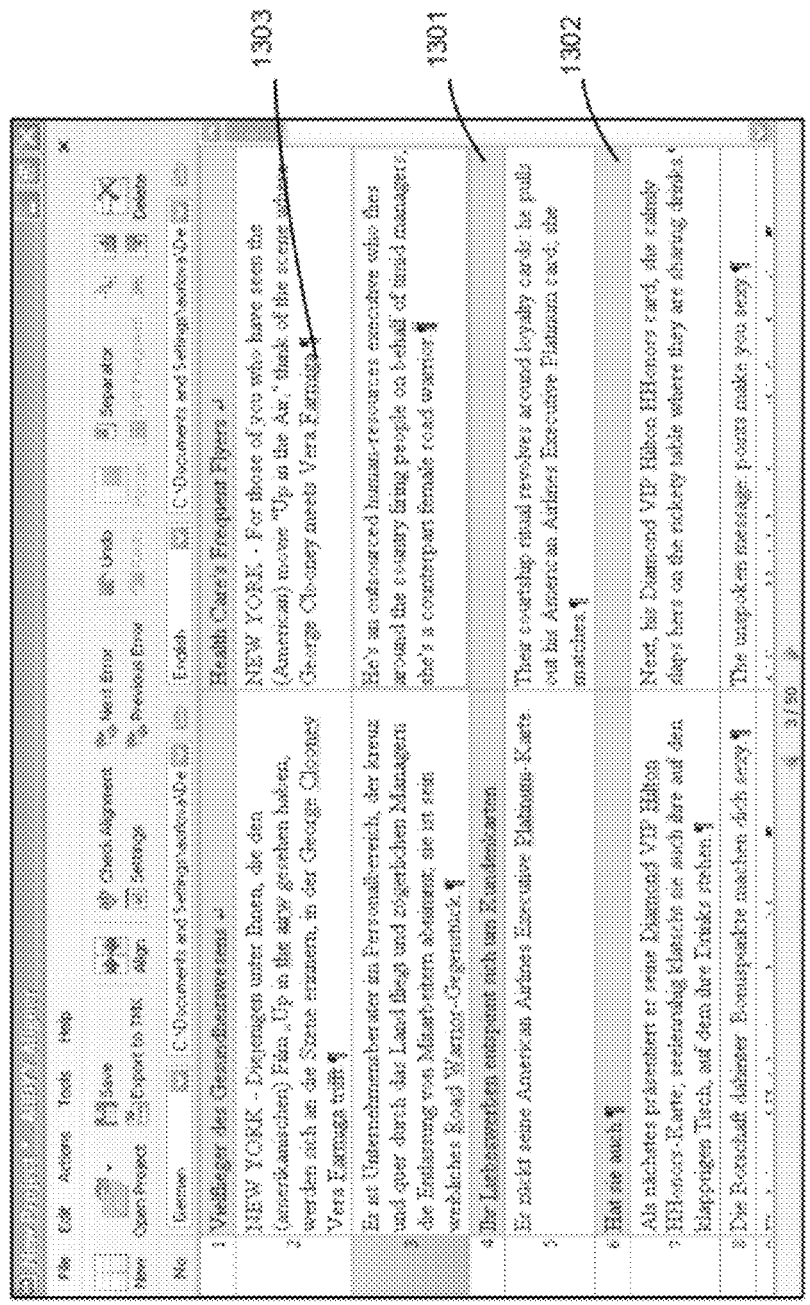
Figure 13B:
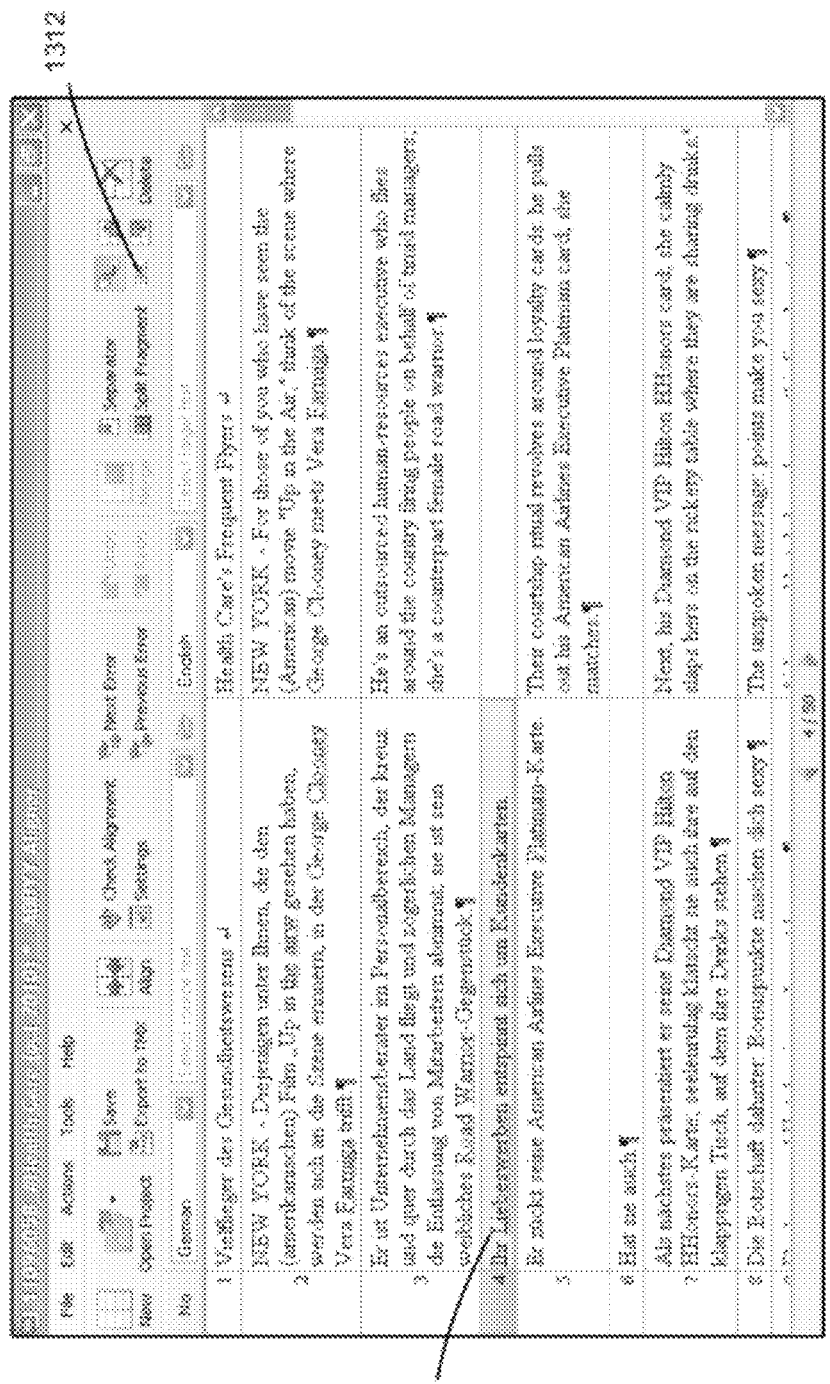
Figure 13C:
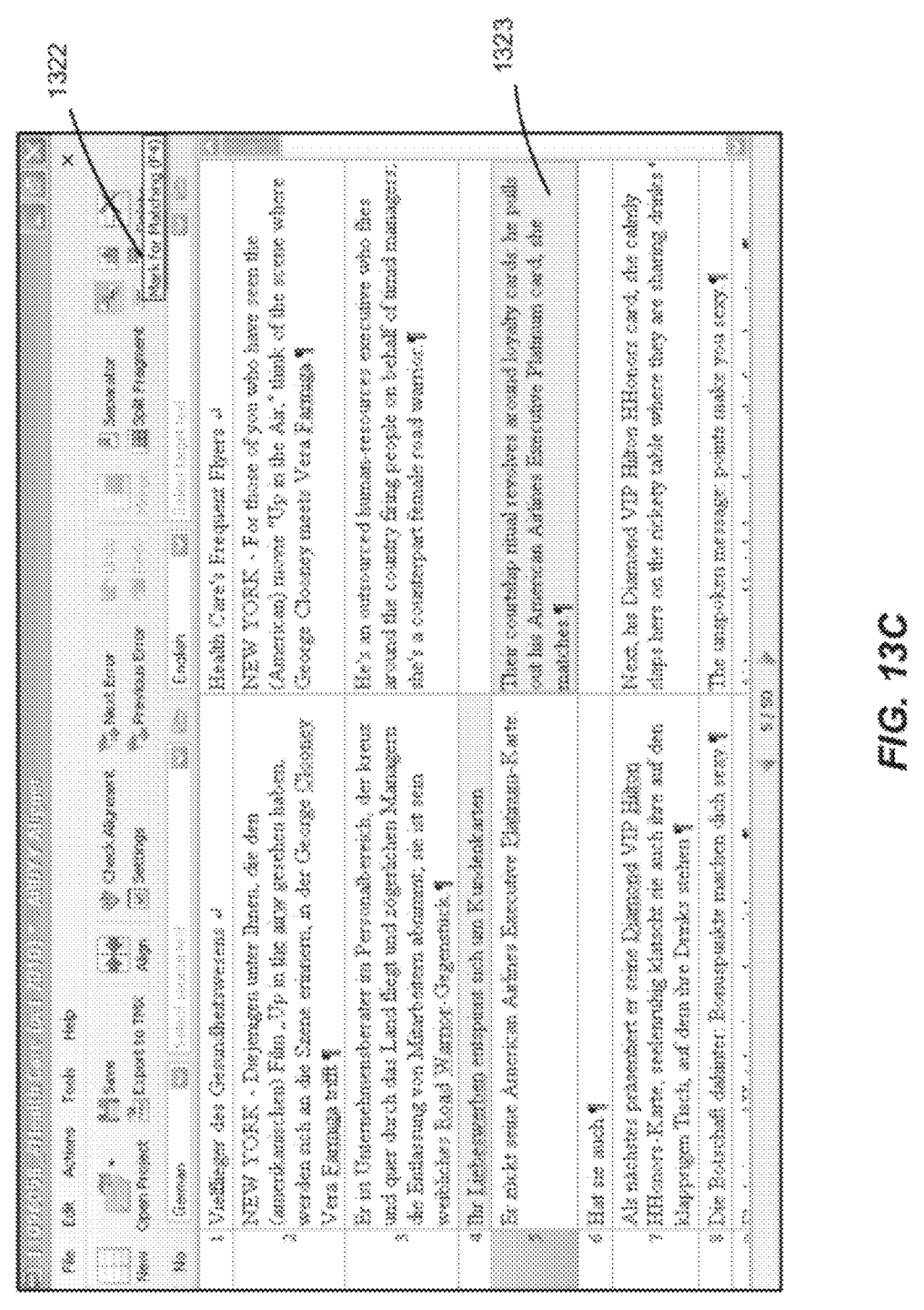
Figure 13D:
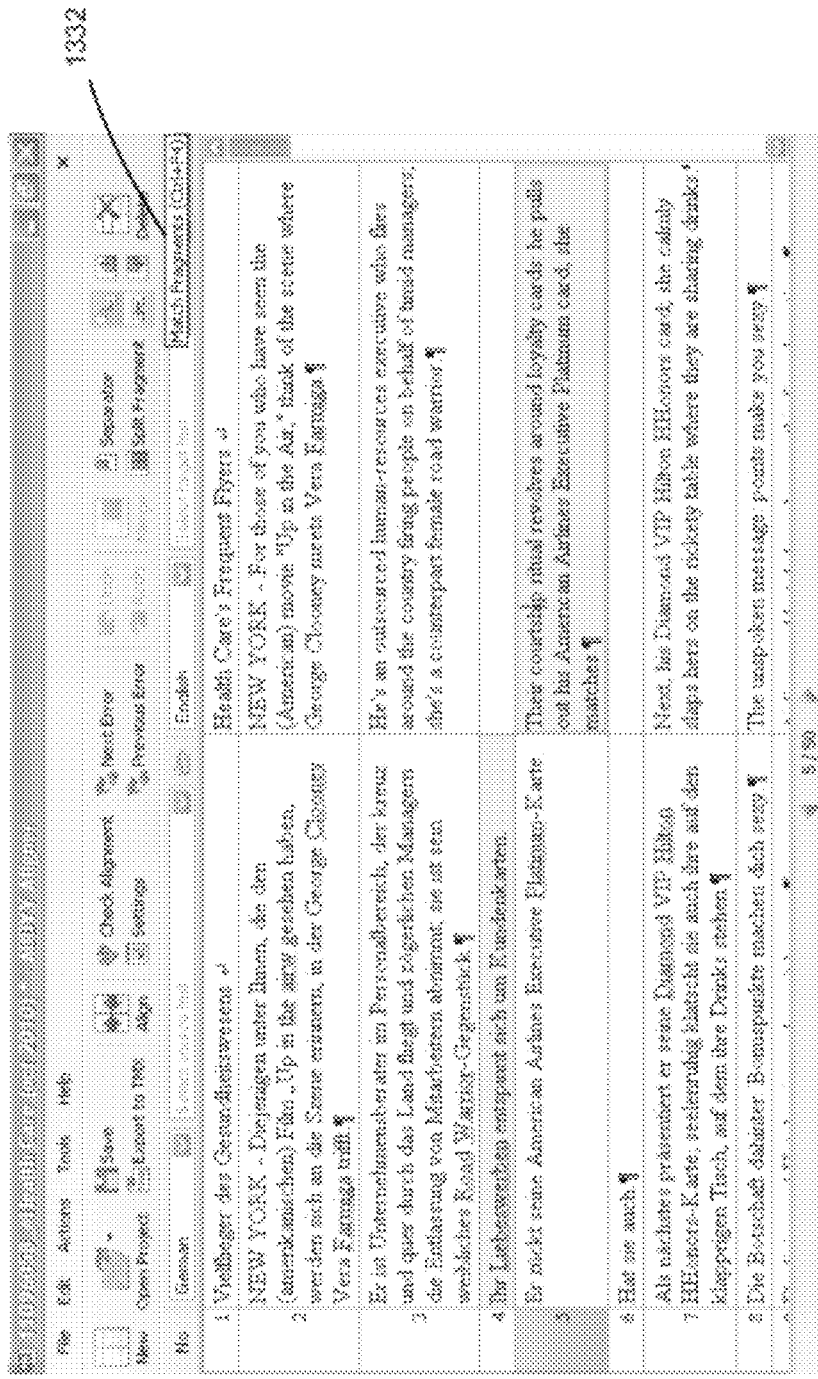
Figure 13E:
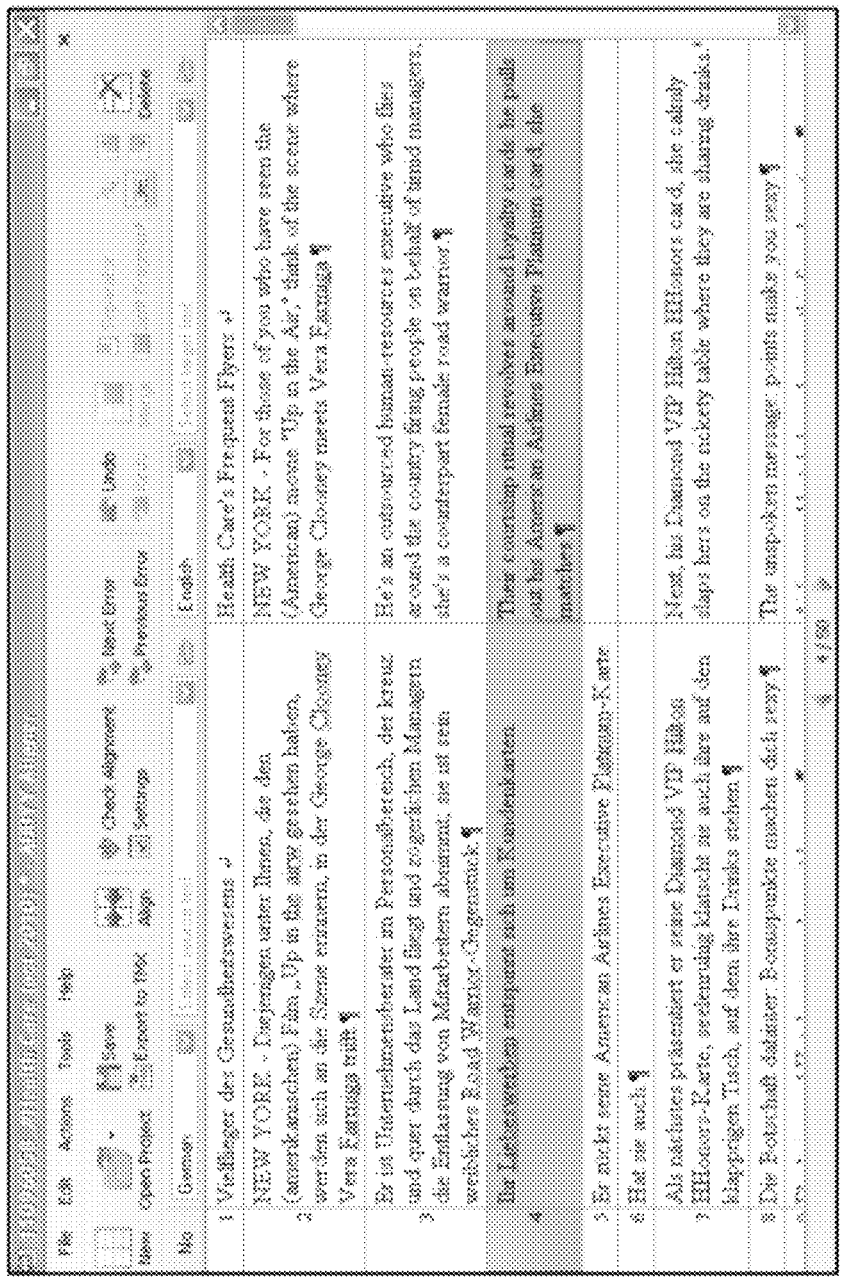
Figure 13F:
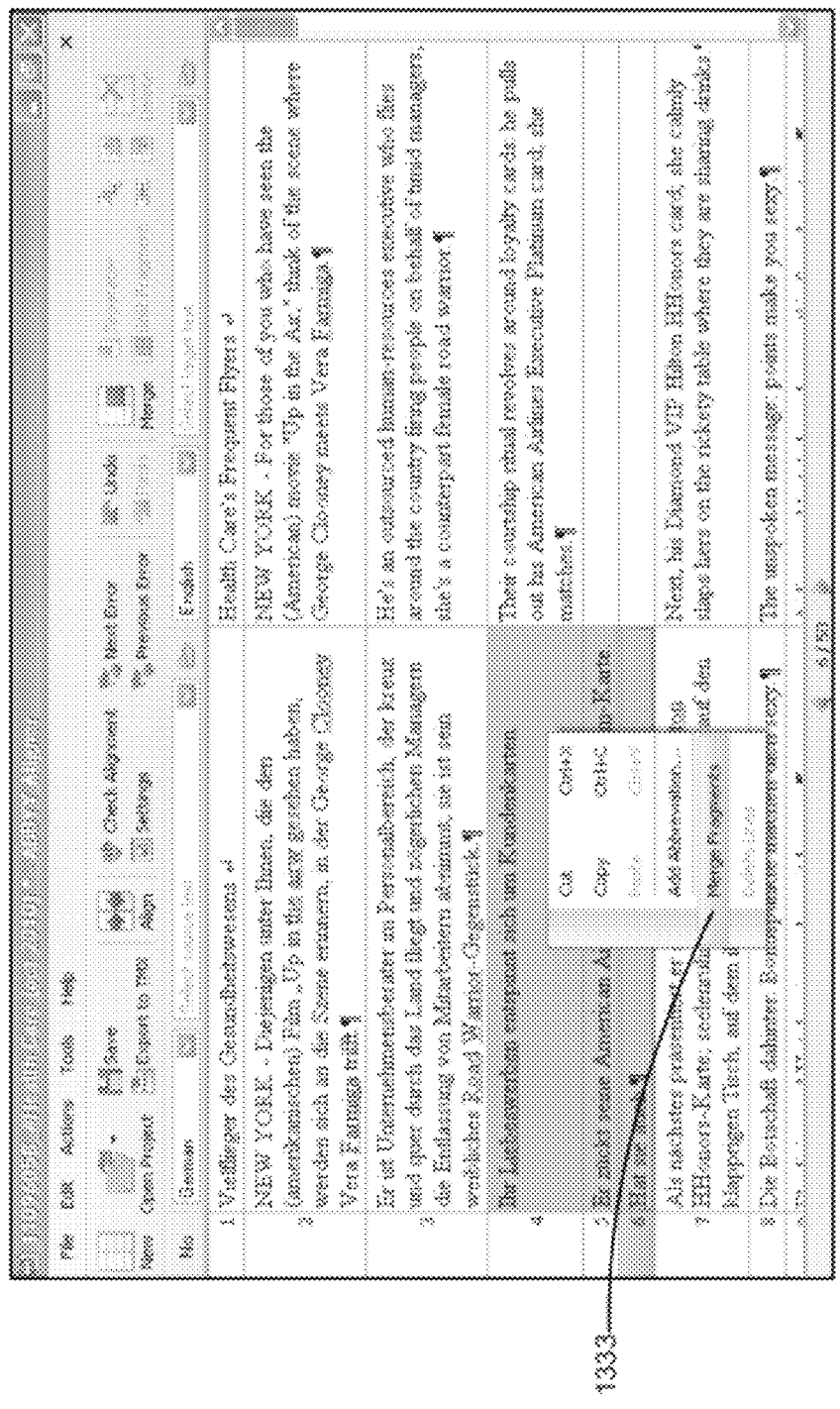

In addition to automated matching of fragments, the user interface provide for manual correction of the alignment. For example, after the first pass of the program, there may be fragments that have been aligned incorrectly. FIG. 13A shows an example of the user interface where after the first alignment, such fragments are highlighted. The lines 4 (1301) and 6 (1302) may be identified by the system as incorrectly processed. Optionally, spelling error, or words which weren't found in a dictionary, like 1303, may be identified, for example, by underlining.

The reason of the incorrectness is that there are three short sentences in the German section translated as one English sentence (line 5). So, the fragments in German and in English parts should be correlated to properly identify parallel fragments. This can be accomplished by aligning English fragment (line 5) by German fragment (line 4) by means of the actions Mark and Match; and then by merging German fragments (lines 4-6) by means of the action Merge. Alternatively it can be accomplished by merging German fragments (lines 4-6) by means of the action Merge, and then aligning English fragment (line 5) by the obtained German fragment (line 4) by means of the actions Mark and Match. Another alternative is to merge German fragments (lines 4-6) by means of the action Merge, and then to move up English fragment (line 5) to obtained German fragment (line 4) by means of actions Up.

Figure 13G:
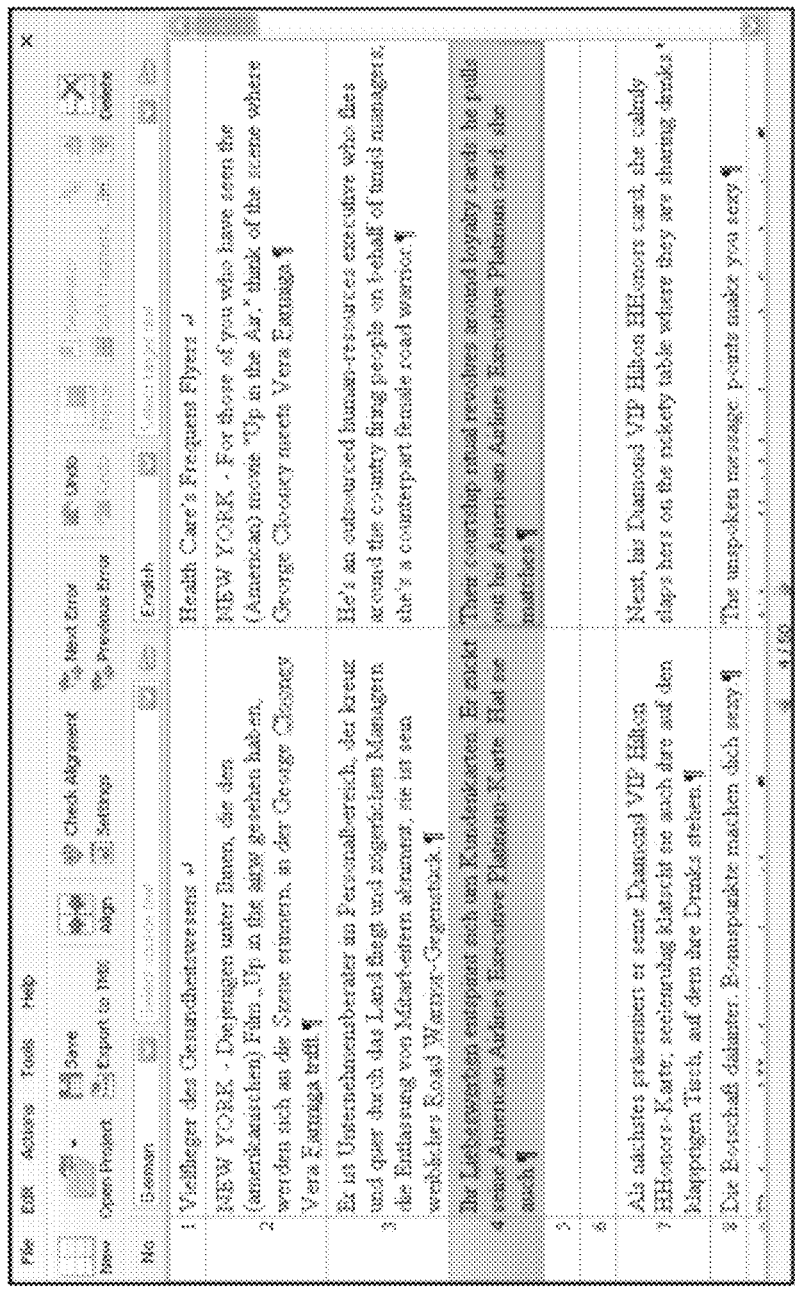

The first two approaches in the previous paragraph allow merging of fragments which are not located side by side. In one embodiment there are special buttons or menu items in the user interface to facilitate such actions. FIGS. 13B-13G demonstrate exemplary interface and alignment correction steps in one embodiment. For example, referring to FIG. 13B, one selects the German fragment (1311) in line 4 and pushes the button Mark (1312). Then, as shown on FIG. 13C, one selects by the button Mark (1322) the corresponding English fragment (1323). After the two fragments have been selected one should push the button Match (1332), as shown on FIG. 13D. After that, as shown on FIG. 13E, the two fragments became aligned. And finally, we have to merge the German fragments in lines 4-6, and to do it, one should select the lines, as shown on FIG. 13F, and choose the action Merge Fragments (1333) in context menu. As result, the fragments are edited and aligned (FIG. 13G). Empty lines may be deleted.

Figure 14:
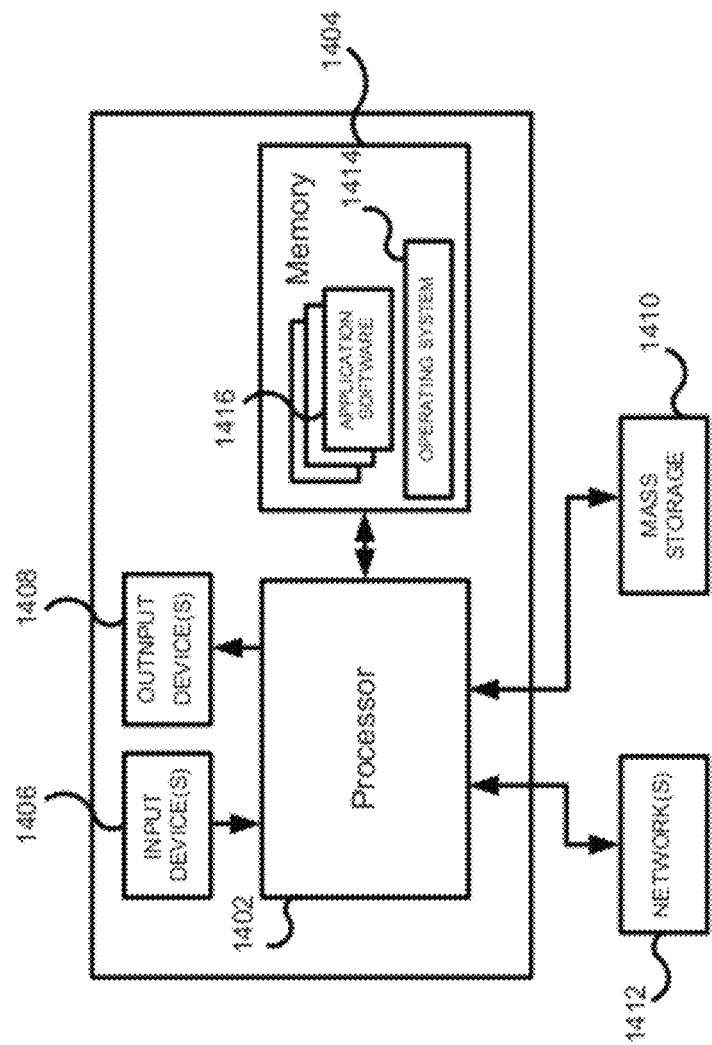
FIG. 14 shows exemplary system architecture.

FIG. 14 shows exemplary system architecture for implementing the techniques and systems described herein, in accordance with one implementation of the present disclosure. Referring to FIG. 14, the exemplary hardware 1400 includes at least one processor 1402 coupled to a memory 1404. The processor 1402 may represent one or more processors (e.g. microprocessors), and the memory 1404 may represent random access memory (RAM) devices comprising a main storage of the hardware 1400, as well as any supplemental levels of memory, e.g., cache memories, non-volatile or back-up memories (e.g. programmable or flash memories), read-only memories, etc. In addition, the memory 1404 may be considered to include memory storage physically located elsewhere in the hardware 1400, e.g. any cache memory in the processor 1402 as well as any storage capacity used as a virtual memory, e.g., as stored on a mass storage device 1410.

The hardware 1400 also typically receives a number of inputs and outputs for communicating information externally. For interface with a user or operator, the hardware 1400 may include one or more user input devices 1406 (e.g., a keyboard, a mouse, imaging device, scanner, microphone) and a one or more output devices 1408 (e.g., a Liquid Crystal Display (LCD) panel, a sound playback device (speaker)). To embody the present invention, the hardware 1400 typically includes at least one display device.

For additional storage, the hardware 1400 may also include one or more mass storage devices 1410, e.g., a removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1412 (e.g., a local area network (LAN), a wide area network (WAN), a wireless network, and/or the Internet among others) to permit the communication of information with other computers coupled to the networks. It should be appreciated that the hardware 1400 typically includes suitable analog and/or digital interfaces between the processor 1402 and each of the components 1404, 1406, 1408, and 1412 as is well known in the art.

The hardware 1400 operates under the control of an operating system 1414, and executes various computer software applications, components, programs, objects, modules, etc. to implement the techniques described above. Moreover, various applications, components, programs, objects, etc., collectively indicated by application software 1416 in FIG. 14, may also execute on one or more processors in another computer coupled to the hardware 1400 via a network 1412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

The invention claimed is:

1. A computer-implemented method of aligning fragments of a first text in a first language with corresponding fragments of a second text, which is a translation of the first text into a second language, comprising:
   preliminarily dividing the first and second texts into fragments;
   generating a hypothesis about correspondence between at least first fragment in the first text and at least second fragment in the second text;
   determining estimations reflecting correspondence between the first and the second fragments, wherein each estimation is based at least on a ratio between: (a) a number of words in at least one of the first segment or the second segment; and (b) a number of words in the first fragment that have a corresponding translation in the second fragment according to a normalized one-to-one dictionary;
   determining a degree of correspondence between the first and the second fragments based on the estimations, including adjusting the estimations by using weight coefficients selected on the basis of heuristics or training; and
   comparing the degree of correspondence to a predetermined threshold.

2. The method of claim 1, wherein the fragments are sentences.

3. The method of claim 1, wherein the hypothesis about correspondence between the fragments is based at least on one of the following: size of the fragments, punctuation symbols, formatting, capital letters, headings, numeration of text parts or paragraphs.

4. The method of claim 1 wherein the estimations include the presence of corresponding word combinations in the first and the second fragments.

5. The method of claim 1 wherein the estimations include the presence in the first and the second fragments of at least one of the following: dates, numbers, abbreviations, family names, or geographical names.

6. The method of claim 1 further comprising, if the degree of correspondence is sufficiently significant, then confirming the hypothesis and saving the correspondence of the first and the second fragments, otherwise, changing boundaries of at least one fragment so as to select a new hypothesis.

7. The method of claim 1 further comprising, adjusting fragment alignment using a user interface that enables a user to consolidate fragments and to modify the correspondence of fragments in the first text and in the second text.

8. A computer-implemented method of aligning fragments of a first text in a first language with corresponding fragments of a second text, which is a translation of the first text into a second language, comprising:
   preliminarily dividing the first and second texts into fragments;
   generating a hypothesis about correspondence between at least first fragment in the first text and at least second fragment in the second text;
   performing a lexico-morphological analysis of the first and the second fragments using linguistic descriptions;
   performing a syntactic analysis of the first and the second fragments using linguistic descriptions and generating a syntactic structure for the first fragment and a syntactic structure for the second fragment;
   generating a semantic structure for the first fragment and a semantic structure for the second fragment, wherein the semantic structures are directional acyclic graphs with nodes that are assigned elements of semantic hierarchy;
   estimating the degree of correspondence between the semantic structure for the first fragment and the semantic structure for the second fragment, wherein estimating the degree of correspondence between the semantic structures includes identifying correspondence of tree structure, deep slots, non-tree links, and semantic classes; and
   if the degree of correspondence between the semantic structure for the first fragment and the semantic structure for the second fragment satisfies a predetermined threshold, saving the generated syntactic and semantic structures for the first fragment in connection with the first fragment; and
   saving the generated syntactic and semantic structures for the second fragment in connection with the second fragment.

9. The method of claim 8, wherein the fragments are sentences.

10. The method of claim 8 further comprising, if the degree of correspondence is sufficiently significant, confirming the hypothesis and saving correspondence between the first and second fragments, otherwise changing boundaries of the fragment so as to select a new hypothesis.

11. The method of claim 10, wherein saving the generated syntactic and semantic structures includes saving syntactic and semantic parameters determined during the lexico-morphological analysis, the syntactic analysis and parameters of the semantic structures.

12. The method of claim 10 wherein saving correspondence between the first and second fragments further comprise saving correspondence between their syntactic structures and saving correspondence between their semantic structures.

13. The method of claim 8 further comprising indexing fragments of the first text and indexing fragments of the second text in accordance with determined correspondence of the fragments of the first and the second texts.

14. The method of claim 13 wherein indexing further comprises indexing syntactic structures and their parameters of the first text and the second text.

15. The method of claim 13 wherein indexing further comprises indexing semantic structures and their parameters of the first text and the second text.

16. The method of claim 8 wherein syntactic and semantic structures are displayed to a user with an XML-like notation.

17. The method of claim 8 further comprising, adjusting fragment alignment using a user interface that enables a user to consolidate fragments and to modify the correspondence of fragments in the first text and in the second text.

18. The method of claim 8, wherein non-tree links of the graphs reflect linguistic phenomena including, at least, ellipsis and coordination.

19. The method of claim 8, wherein estimating the correspondence between the semantic structures comprises mapping graphs to produce a set of node pairs and computing node distances for the pairs.

20. The method of claim 19, wherein estimating the correspondence between the semantic structures further comprises comparing a predetermined value to the accumulated node distances.

21. The method of claim 19, wherein the node distances are determined by the relative location of nodes in a semantic hierarchy.

22. The method of claim 8, wherein the syntactic and semantic structures, generated for the first and the second fragments, are displayed to a user with a graph-like notation.

23. A computer system for aligning fragments of a first text in a first language with corresponding fragments of a second text, which is a translation of the first text into a second language, comprising:
   a processor; and
   a memory coupled to the processor, the memory storing instructions, which when executed by the computer system for aligning fragments cause the system to perform a method comprising:
   preliminarily dividing the first and second texts into fragments;
   generating a hypothesis about correspondence between at least first fragment in the first text and at least second fragment in the second text;
   performing a lexico-morphological analysis of the first and the second fragments using linguistic descriptions;
   performing a syntactic analysis of the first and the second fragments using linguistic descriptions and generating a syntactic structure for the first fragment and a syntactic structure for the second fragment;
   generating a semantic structure for the first fragment and a semantic structure for the second fragment, wherein the semantic structures are directional acyclic graphs with nodes that are assigned elements of semantic hierarchy;
   estimating the degree of correspondence between the semantic structure for the first fragment and the semantic structure for the second fragment, wherein estimating the degree of correspondence between the semantic structures includes identifying correspondence of tree structure, deep slots, non-tree links, and semantic classes; and
   if the degree of correspondence between the semantic structure for the first fragment and the semantic structure for the second fragment satisfies a predetermined threshold, saving the generated syntactic and semantic structures for the first fragment in connection with the first fragment; and
   saving the generated syntactic and semantic structures for the second fragment in connection with the second fragment.

24. The system of claim 23, wherein the fragments are sentences.

25. The system of claim 23, wherein the semantic structures are directional acyclic graphs with nodes that are assigned elements of semantic hierarchy.

26. A computer-readable medium having stored thereon a sequence of instructions, which, when executed by a computer system for aligning fragments of a first text in a first language with corresponding fragments of a second text, which is a translation of the first text into a second language, causes the system to perform a method, comprising:
   preliminarily dividing the first and second texts into fragments;
   generating a hypothesis about correspondence between at least first fragment in the first text and at least second fragment in the second text;
   performing a lexico-morphological analysis of the first and the second fragments using linguistic descriptions;
   performing a syntactic analysis of the first and the second fragments using linguistic descriptions and generating a syntactic structure for the first fragment and a syntactic structure for the second fragment;
   generating a semantic structure for the first fragment and a semantic structure for the second fragment, wherein the semantic structures are directional acyclic graphs with nodes that are assigned elements of semantic hierarchy;
   estimating the degree of correspondence between the semantic structure for the first fragment and the semantic structure for the second fragment, wherein estimating the degree of correspondence between the semantic structures includes identifying correspondence of tree structure, deep slots, non-tree links, and semantic classes; and
   if the degree of correspondence between the semantic structure for the first fragment and the semantic structure for the second fragment satisfies a predetermined threshold, saving the generated syntactic and semantic structures for the first fragment in connection with the first fragment; and
   saving the generated syntactic and semantic structures for the second fragment in connection with the second fragment.

27. The computer-readable medium of claim 26, wherein the fragments are sentences.

28. The computer-readable medium of claim 26 further comprising, if the degree of correspondence is sufficiently high, confirming the hypothesis, otherwise changing boundaries of the fragment so as to select a new hypothesis.

* * * * *